United States Patent
Cooke

(10) Patent No.: US 9,628,389 B2
(45) Date of Patent: Apr. 18, 2017

(54) DYNAMIC, ASYMMETRIC RINGS

(71) Applicant: GENESIS TECHNICAL SYSTEMS CORP., Calgary (CA)

(72) Inventor: Stephen P. Cooke, Rocky View (CA)

(73) Assignee: GENESIS TECHNICAL SYSTEMS CORP., Calgary (CA)

( * ) Notice: Subject to any disclaimer, the term of this patent is extended or adjusted under 35 U.S.C. 154(b) by 426 days.

(21) Appl. No.: 14/155,476

(22) Filed: Jan. 15, 2014

(65) Prior Publication Data

US 2014/0126365 A1 May 8, 2014

Related U.S. Application Data

(62) Division of application No. 12/733,996, filed as application No. PCT/CA2008/001722 on Oct. 1, 2008, now Pat. No. 8,660,003.

(Continued)

(51) Int. Cl.
*H04L 12/26* (2006.01)
*H04L 12/803* (2013.01)
(Continued)

(52) U.S. Cl.
CPC ............ *H04L 47/122* (2013.01); *H04L 12/66* (2013.01); *H04L 47/10* (2013.01); *H04L 47/11* (2013.01);
(Continued)

(58) Field of Classification Search
CPC ....... H04L 47/122; H04L 47/10; H04L 47/11; H04L 47/13; H04L 47/263; H04L 47/33; H04L 12/66; H04L 2012/6478
See application file for complete search history.

(56) References Cited

U.S. PATENT DOCUMENTS 5,699,345 A 12/1997 Watanuki et al.
6,314,110 B1 11/2001 Chin et al.
(Continued)

FOREIGN PATENT DOCUMENTS

EP 1 065 833 A2 1/2001
JP 2004015251 A2 1/2004

OTHER PUBLICATIONS

J. Chen, I. Cidon & Y. Ofek, "A Local Fairness Algorithm for the Metaring, and Its Performance Study", Communication for Global Users, Including A Communications Theory Mini Conference, Orlando, Dec. 6-9, 1992: [Proceedings of the Global Telecommunications Conference (GLOBECOM)], New York, IEEE, US, vol.,-. Dec. 6, 1992.

(Continued)

*Primary Examiner* — Jutai Kao
(74) *Attorney, Agent, or Firm* — Wolf, Greenfield & Sacks, P.C.

(57) ABSTRACT

Dynamic, asymmetric rings and related communication equipment and methods are disclosed. Various features may be implemented to provide any or all of several degrees of freedom for managing resources in a communication network. Communication rates may be optimized on a node-to-node basis or overall on a network level. Different rates may be configured and possibly dynamically adjusted between different nodes, and/or for different directions of traffic transfer. Bandwidth can be dynamically allocated along a string of the communication nodes in a ring or linear topology in some embodiments. Direction of traffic transfer represents an additional possible degree of freedom in a ring topology, in that traffic can be transferred in either direction in a ring, such as the direction of least delay.

18 Claims, 12 Drawing Sheets

Asymmetric DSL Rings Dynamically Optimized Ring

Related U.S. Application Data

(60) Provisional application No. 60/977,231, filed on Oct. 3, 2007.

(51) Int. Cl.
    *H04L 12/66*     (2006.01)
    *H04L 12/801*     (2013.01)
    *H04L 12/825*     (2013.01)

(52) U.S. Cl.
    CPC ............ *H04L 47/13* (2013.01); *H04L 47/263* (2013.01); *H04L 47/33* (2013.01); *Y02B 60/31* (2013.01)

(56) References Cited

U.S. PATENT DOCUMENTS

| | | |
|---|---|---|
| 6,356,530 B1 | 3/2002 | Tomaszewski et al. |
| 6,909,888 B2 | 6/2005 | Lee et al. |
| 2002/0059408 A1* | 5/2002 | Pattabhiraman ........ H04J 3/085 709/223 |
| 2003/0076781 A1 | 4/2003 | Enomoto et al. |
| 2003/0163593 A1 | 8/2003 | Knightly |
| 2004/0100909 A1 | 5/2004 | Lee |
| 2004/0179518 A1 | 9/2004 | Bruckman et al. |
| 2005/0152382 A1 | 7/2005 | Stirling et al. |
| 2005/0201282 A1 | 9/2005 | Howard et al. |
| 2006/0209877 A1* | 9/2006 | Yamamoto ............ H04L 12/437 370/452 |
| 2007/0030856 A1 | 2/2007 | Cooke et al. |
| 2007/0260792 A1* | 11/2007 | Pathak .................. G06F 13/364 710/113 |

OTHER PUBLICATIONS

Extended European Search Report issued on Jan. 28, 2011 in respect of EP Application Serial No. 08800405.6.

U.S. Office Action issued on Mar. 15, 2013 in respect of U.S. Appl. No. 12/733,996 (16 pages).

U.S. Office Action issued on Oct. 24, 2012 in respect of U.S. Appl. No. 12/733,996 (6 pages).

Notice of Allowance and Notice of Allowability issued on Oct. 9, 2013 in respect of U.S. Appl. No. 12/733,996 (9 pages).

Extended European Search Report issued on Jan. 20, 2017 in respect of EP Application Serial No. 16160652.0 (6 pages).

\* cited by examiner

Deployment of Mixed xDSL Links in a DSL Ring Configuration

Ring with Inherent Bandwidth Bottlenecks

Migration of Ring Network Conditions Over Time

Asymmetric DSL Rings Dynamically Optimized Ring

Average Bandwidth Demand (ABD) for a DSL Link

Average Bandwidth Demand Ratio Values

ABD Determination Handshake from Adjacent Node

DYNAMIC, ASYMMETRIC RINGS

CROSS-REFERENCE TO RELATED APPLICATIONS

The present application is a divisional of U.S. patent application Ser. No. 12/733,996 entitled "DYNAMIC, ASYMMETRIC RINGS", filed on Apr. 2, 2010, which is a national stage filing under U.S.C. 371 of PCT International Application PCT/CA2008/001722, filed Oct. 1, 2008 and claims the benefit of U.S. Provisional Patent Application Ser. No. 60/977,231 entitled "DYNAMIC, ASYMMETRIC RINGS", filed on Oct. 3, 2007. The entire contents of each referenced application are incorporated herein by reference.

FIELD OF THE INVENTION

This invention relates generally to communications and, in particular, to communications between nodes in a ring topology.

BACKGROUND

DSL Rings, such as disclosed in U.S. patent application Ser. No. 11/463,240, filed on Aug. 8, 2006, and in U.S. Provisional Patent Application Ser. No. 60/706,022, filed on Aug. 8, 2005, the entire contents of both of which are incorporated herein by reference, represent a new and powerful reconfiguration of existing telecom network resources.

Traditional ring network implementations require support for only individual bandwidth cases (e.g.: 155 Mb/s, 622 Mb/s, 1 Gb/s, 2.4 Gb/s, 10 Gb/s, etc.). These implementations detail various parameters and control timings based on the assumption that the given bandwidth numbers are static, and the bandwidth in transmit and receive directions between nodes are always equal and identical all the way around the ring.

SUMMARY OF THE INVENTION

According to an aspect of the invention, there is provided a communication node comprising: at least one interface that enables the communication node to transfer communication traffic between first and second adjacent communication nodes at respective first and second communication rates; a communication control module, operatively coupled to the at least one interface, that determines whether a congestion condition exists at the communication node for transfer of communication traffic between the first and second adjacent communication nodes, and requests adjustment of the first and second communication rates by the first and second adjacent communication nodes to increase one of the first and second communication rates and to decrease the other of the first and second communication rates where the congestion condition exists.

In some embodiments, the at least one interface comprises first and second interfaces that respectively enable the communication node to exchange communication traffic with the first and second adjacent communication nodes in a ring or linear topology.

In some embodiments, the communication node further comprises: at least one traffic queue that stores traffic to be transferred between the first and second adjacent communication nodes, and the rate control module determines whether the congestion condition exists based on one or more of: a priority of the traffic or an amount of the traffic stored in the at least one traffic queue.

In some embodiments, the first and second communication rates represent respective portions of total bandwidth available for bidirectional communication traffic transfer between the first adjacent communication node and the communication node and between the second adjacent communication node and the communication node, and the communication control module requests adjustment by requesting adjustments to the respective portions of total available bandwidth for communication traffic transfer in a direction in which the congestion condition exists.

In some embodiments, the communication control module further detects an improvement in the congestion condition at the communication node, and requests adjustment of the first and second communication rates by the first and second adjacent communication nodes toward respective default communication rates responsive to detection of an improvement.

In some embodiments, the communication control module requests adjustment of the first and second communication rates by the first and second adjacent communication nodes by negotiating respective adjusted first and second communication rates with the first and second adjacent communication nodes.

In some embodiments, the communication control module further determines whether one or both of the first and second communication rates should be adjusted due to a congestion condition at the first adjacent communication node, a congestion condition at the second adjacent communication node, or congestion conditions at both the first adjacent communication node and second adjacent communication node, and adjusts one or both of the first and second communication rates where it is determined that one or both of the first and second communication rates should be adjusted.

In some embodiments, the communication node is implemented in a communication system that further comprises the first and second adjacent communication nodes, each of first and second adjacent communication nodes comprising: an interface that enables the adjacent communication node to exchange communication traffic with the communication node; a communication control module, operatively coupled to the interface, that determines whether the first or second communication rate should be adjusted due to the congestion condition at the communication node, and adjusts the first or second communication rate where it is determined that the first or second communication rate should be adjusted.

There is also provided a method comprising: determining, at a communication node, whether a congestion condition exists for transfer of communication traffic by the communication node between a first adjacent communication node and a second adjacent communication nodes; and requesting adjustment of the first and second communication rates by the first and second adjacent communication nodes to increase one of the first and second communication rates and to decrease the other of the first and second communication rates where the congestion condition exists.

Another aspect of the invention provides a communication node comprising: an interface that enables the communication node to receive communication traffic from an adjacent communication node at a communication rate; a communication control module, operatively coupled to the first and second interfaces, that determines whether the communication rate should be increased due to a congestion condition at the adjacent communication node for transfer of communication traffic to the communication node, and increases the communication rate where it is determined that the communication rate should be increased.

In some embodiments, the communication control module determines whether the communication rate should be increased responsive to a request from the adjacent communication node to increase the communication rate.

In some embodiments, the communication rate represents a portion of total bandwidth available for bidirectional communication traffic transfer between the adjacent communication node and the communication node, and the communication control module increases the communication rate by increasing the portion of total available bandwidth for communication traffic in a direction from the adjacent communication node to the communication node.

In some embodiments, the total available bandwidth comprises a plurality of frequency bands respectively allocated for transfer of communication traffic in opposite directions between the adjacent communication node and the communication node, and the communication control module increases the communication rate by re-allocating a frequency band that has been allocated for communication traffic transfer in a direction from the communication node to the adjacent communication node, to the direction from the adjacent communication node to the communication node.

In some embodiments, the communication control module decreases the communication rate toward a default communication rate over time.

In some embodiments, the communication control module decreases the communication rate according to an aging process or responsive to a request received from the adjacent communication node.

In some embodiments, the communication control module determines whether the communication rate should be increased by negotiating an increased communication rate with the adjacent communication node.

There is also provided a method comprising: determining, at a communication node that receives communication traffic from an adjacent communication node at a communication rate, whether the communication rate should be increased due to a congestion condition at the adjacent communication node for transfer of communication traffic to the communication node; and increasing the communication rate where it is determined that the communication rate should be increased.

Yet another aspect of the invention provides a communication node comprising: at least one interface that enables the communication node to exchange communication traffic with adjacent communication nodes in a ring topology; and a communication control module, operatively coupled to the at least one interface, that enables respective communication rates between the communication node and each of the adjacent communication nodes to be set to different rates for opposite directions of traffic flow in the ring topology.

In some embodiments, the communication rate between the communication node and each adjacent communication node comprises a respective rate for each direction of traffic flow, and the communication control module enables dynamic adjustment of a ratio of the respective rates.

In some embodiments, the communication control module collects rate information from the adjacent communication nodes, and determines adjusted ratios based on the collected rate information.

In some embodiments, the communication control module determines whether an adjusted ratio differs from a current ratio by at least a threshold amount, and applies the adjusted ratio where the adjusted ratio differs from the current ratio by at least a threshold amount.

In some embodiments, the communication control module collects information from the adjacent communication nodes and determines adjusted ratios based on the collected information.

In some embodiments, the communication control module implements a dynamic rate adjustment algorithm, and allows the dynamic rate adjustment algorithm to be enabled or disabled.

In some embodiments, the communication node is implemented in a communication system that further comprises a plurality of communication nodes, including the adjacent communication nodes, that are interconnected in the ring topology, each of at least one of the plurality of communication nodes comprising: at least one interface that enables the communication node to exchange communication traffic with adjacent communication nodes in the ring topology; and a communication control module, operatively coupled to the at least one interface, that enables respective communication rates between the communication node and each of its adjacent communication nodes to be set to different rates for opposite directions of traffic flow in the ring topology.

A related method comprises providing for exchange of communication traffic between a communication node and adjacent communication nodes in a ring topology; and setting respective communication rates between the communication node and each of the adjacent communication nodes to different rates for opposite directions of traffic flow in the ring topology.

A network according to another aspect of the invention comprises: a plurality of communication nodes; and a plurality of communication links operatively coupling the communication nodes together in a ring or linear topology, each communication node comprising a communication control module that enables respective total communication rates between the plurality of communication nodes to be set to different rates between different communication nodes.

In some embodiments, each communication node supports an ADM (Add/Drop Multiplexer) function.

In some embodiments, the communication links enable the communication nodes to communicate via DSL (Digital Subscriber Line) communications.

In some embodiments, the DSL communications are of a type selected from a group consisting of: ADSL (Asynchronous DSL), ADSL2+, SDSL (Symmetric DSL), Uni-DSL (Universal DSL), VDSL (Very high bit rate DSL), and VDSL2 (Very high bit rate DSL version 2).

A further aspect of the invention provides a method comprising: providing for exchange of communication traffic between a plurality of communication nodes in a ring or linear topology; and setting respective total communication rates between the plurality of communication nodes to different rates between different communication nodes.

There is also provided a network comprising: a plurality of communication nodes; a plurality of communication links operatively coupling the communication nodes together in a ring or linear topology; and respective communication control modules, in the communication nodes, that allow bandwidth to be dynamically allocated along a string of the communication nodes from a first communication node to a second communication node through one or more intermediate nodes between the first and second communication nodes.

In some embodiments, the communication control modules in the intermediate communication nodes change bandwidth allocations in increasing amounts from the first communication node to the second communication node.

According to another aspect of the present invention, a method comprises: providing for exchange of communication traffic between a plurality of communication nodes in a ring or linear topology; and dynamically allocating bandwidth along a string of the communication nodes from a first communication node to a second communication node through one or more intermediate nodes between the first and second communication nodes.

There is also provided a communication node comprising: at least one interface that enables the communication node to communicate with other communication nodes in a ring or linear topology, the other communication nodes comprising at least one adjacent communication node with which the communication node communicates directly and non-adjacent communication nodes with which the communication node communicates through intermediate communication nodes; and a communication control module, operatively coupled to the at least one interface, that determines whether respective communication rates between the plurality of communication nodes should be adjusted based on information associated with the adjacent communication nodes and the non-adjacent communication nodes, and requests adjustment of any of the respective communication rates that should be adjusted.

In some embodiments, the communication node is implemented in a communication system that comprises the communication node and the other communication nodes, wherein each of the other communication nodes comprises a local communication control module that determines whether a local communication rate at the node should be adjusted, and applies a conflict resolution process where the local communication control module and the communication control module at the communication node make different determinations for adjustment of the local communication rate.

In some embodiments, the conflict resolution process takes into account relative priorities of the communication node and the other communication nodes.

There is also provided a method comprising: providing for communications between a communication network node and other communication nodes in a ring or linear topology, the other communication nodes comprising at least one adjacent communication node with which the communication node communicates directly and non-adjacent communication nodes with which the communication node communicates through intermediate communication nodes; determining at the communication node whether respective communication rates between the plurality of communication nodes should be adjusted based on information associated with the adjacent communication nodes and the non-adjacent communication nodes; and requesting adjustment of any of the respective communication rates that should be adjusted.

There is also provided a communication node comprising: at least one interface that enables the communication node to communicate with other communication nodes in a ring topology; and a communication control module, operatively coupled to the at least one interface, that receives communication traffic for transmission on the ring, determines a direction of least delay for transfer on the ring, and transmits the received traffic through the at least one interface in the determined direction of least delay.

A related method comprises receiving communication traffic for transmission on a ring; determining a direction of least delay for transfer on the ring; and transmitting the received traffic on the ring in the determined direction of least delay.

Other aspects and features of embodiments of the present invention will become apparent to those ordinarily skilled in the art upon review of the following description.

BRIEF DESCRIPTION OF THE DRAWINGS

Examples of embodiments of the invention will be described in greater detail with reference to the drawings.

DETAILED DESCRIPTION OF PREFERRED EMBODIMENTS

Embodiments of the present invention may be applied, for example, to DSL Rings as disclosed in the above-referenced patent applications. Therefore, a brief description of bonded DSL Rings is provided below.

Star Topology

Those familiar with DSL communications will appreciate that in one known network topology for connecting copper pairs between households and a CO, many households or customer sites are interconnected with a single CO using twisted pair cables in a star network topology. The interconnections are generally referred to as the "last mile".

The transmission bandwidth of technologies such as DSL and Ethernet decreases with distance. In a star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible.

Ring Topology

Figure 1:
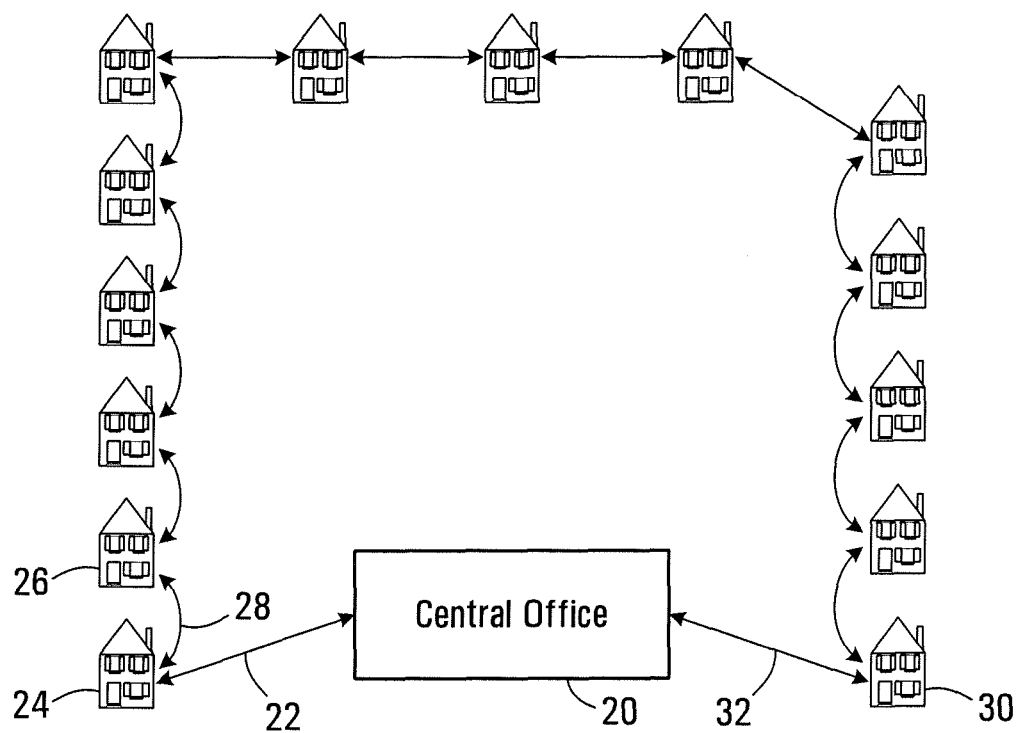
FIG. 1 is a block diagram of an example ring network topology for connecting copper pairs between households and a CO (Central Office).

Referring now to FIG. 1, shown is an example ring network topology for connecting copper pairs between households and a CO. While throughout this description copper pairs are referred to, more generally any electrically conducting twisted wire pairs can be employed. Many households 24, 26, . . . , 30 and a single CO 20 are interconnected using twisted pair cables in a ring network topology. More specifically, the CO 20 is connected to a first household 24 with twisted pair cables 22; the first household 24 is connected to second household 26 with twisted pair cable 28 and so on to the last household 30, which is connected to the CO 20 with twisted pair cables 32. Each household has a customer communications node that provides packet add/drop functionality. In a particular example, the customer communications node is an HCC (Home Communications Centre), which enables DSL ring topologies in telecom service provider networks. Example HCCs are described in detail below with reference to FIGS. 2 and 5. A 'Ring' is a special case of the more general 'Daisy Chain of Add/Drop Multiplexers (ADMs)' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local loop'. High bandwidth is made available to the households by reducing the transmission distance to that between households instead of between households and gateway nodes or Central Offices. Maximum bandwidth is obtained if the distance between houses connected together is less than the maximum bandwidth distance.

In some embodiments, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables. In some cases it may be possible to achieve the ring topology by simply "jumpering" twisted pairs together inside these access points so that no actual "cutting of wires" is necessary.

In some implementations, once the new topology is available, a complete package of services with a documented feature evolution is implemented. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e., platform updates performed without customer intervention), and Medical Aid Monitoring.

HCC (Home Communications Centre)

Figure 2:
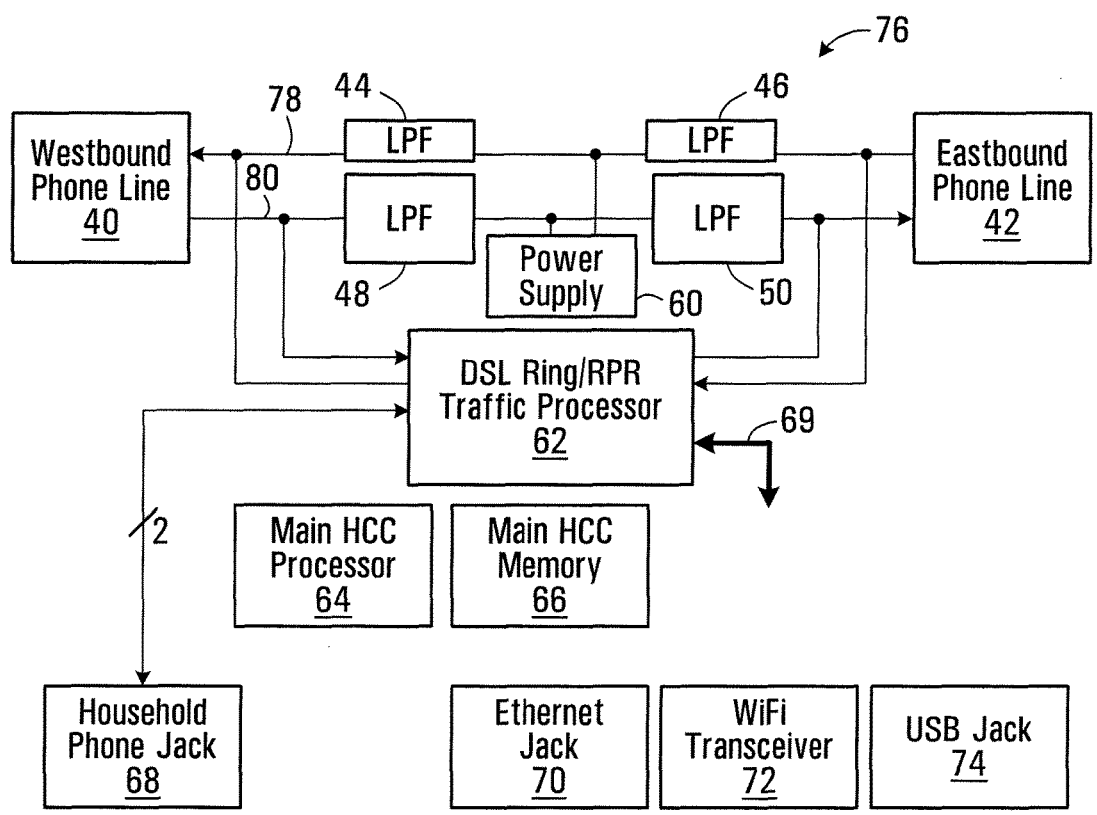
FIG. 2 is a block diagram of an example HCC (Home Communications Centre).

Referring now to FIG. 2, shown is a block diagram of an example HCC (Home Communications Centre) generally indicated at 76. It is to be understood that the HCC 76 shown in FIG. 2 is very specific for example purposes only. In general, equipment in conjunction with which embodiments of the present invention may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a copper pair of wires. The HCC has a DSL Ring/RPR traffic processor 62 coupled to the westbound phone line and the eastbound phone line. The HCC also has a main HCC processor 64 and a main HCC memory 66. A power supply 60 is coupled to the westbound phone line 40 and the eastbound phone line 42 via respective LPFs (low pass filters) 44, 46, 48, 50. A household phone jack 68 is coupled to the DSL Ring/RPR traffic processor 62. Other possible interfaces include an Ethernet jack 70, a WIFI transceiver 72, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be Resilient Packet Ring (RPR, IEEE 802.17) technology. RPR was developed for the optical transport infrastructure, but might also be adapted to fit well into this application.

There are two twisted copper pairs: the eastbound phone line 40, and the westbound phone line 42 (i.e., in opposite directions). In some implementations, communication over a phone line is bi-directional. In some embodiments, the data rate is symmetrical (i.e., transmit bit rate=receive bit rate) for both Eastbound and Westbound directions. A similar approach can be used on the eastbound phone line 42. In some embodiments, flow control mechanisms are used so that the data rate is the same around the ring and so that there are no links that are faster than others. A given household may communicate with the CO by an Eastbound path and/or a Westbound path. In some implementations, if communication on a ring via one direction is not possible, then communication via the other direction is attempted.

Since a number of households are occupying a single ring, there is generally no baseband channel available for each household for analogue communication although it would be technically feasible to provide a single baseband channel in each direction, for example to a first household in each direction. As such (in the most likely scenario), conventional POTS (Plain Ordinary Telephone Service) communications such as telephone and FAX are also digitized and sent on the ring. Thus, communication over the eastbound phone line and the westbound phone line is digital only, for example using DSL communication. Accordingly, if analog devices, such as analog telephones and fax machines, are to be interfaced with the HCC, then the HCC needs to provide D/A (digital to analogue) and A/D (analogue to digital) conversions. Such conversions are not necessary for interfacing the HCC with digital communication devices. Also, in such implementations, the CO ensures that communication transmitted to an HCC is digital. Digital communication comprises data packet communication. DSL communication is an example of digital communication.

Another possible option would be to provide support for baseband POTS and implement each ring in the form of a DSL frequency overlay.

The household phone jack 68, the Ethernet jack 70, and the WiFi transceiver 72 provide communication interfaces for the household. The USB jack 74 enables memory and maintenance access for the HCC 76 when it is installed. The HCC 76 may be installed in a residence and preferably remains with the residence permanently. This can be used to enable AMR (automatic meter reading) functionality. In some implementations, the architecture combines existing home phones with mobile phones. This may for example include most recent and/or backward compatible wireless interfaces. In some embodiments, the HCC 76 has a wireless interface, for example the WiFi (IEEE 802.11a/b/g/n) interface 72 to enable communication with wireless devices, for example wireless appliances, stereos, PCs, TVs, meters, mobile phones, Set Top Boxes (STBs), etc.

In some implementations, a QoS (quality of service) is provided so as to provide certain communications with greater priority than other communications. A list of example communications with decreasing priorities may be VoIP communication, streaming video communication, and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAs (service level agreements) to their customers based on traffic volume at each priority level. For example, customer A gets N GB/month of Priority 1 traffic and M GB/month of Priority 2 traffic, etc. while customer B may get totally different traffic profiles.

In some embodiments, the HCC is partially powered from the phone lines so there is no dependency on household current supply for land line-based phone service. In some implementations, the household phone jack 68 and the traffic processor 62 are powered by at least one of the phone lines while the remaining components may be powered by household current (i.e., these components would be 'plugged in'). For example, each phone line could supply power via the potential difference between the first copper wire 78 at −48V and the second copper wire 80 at 0V in a DC-based architecture. The LPFs 44, 46, 48, 50 remove digital signals from the westbound phone line 40 and the eastbound phone line 42. By using power from the phone line, lightning threats to CO equipment are reduced, as the lightning strike could be eliminated or reduced by the first homes that it touches in either direction.

In some embodiments, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (i.e., user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO). Third, having a star topology means that no one else can 'listen' to another's phone calls, as there is no one else in the transmission path. In some implementations, the HCC provides similar capability via encryption.

Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the illustrated example, specific example interfaces are shown. In a specific example, the HCC has an Internet firewall/VPN (Virtual Private Network), 2 or 3 phone jacks (RJ11), a USB port for memory and maintenance access, a WiFi interface, and an EtherNet cable jack (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communications node is a traffic add/drop function. In the above example this is implemented in the traffic processor but other implementations are possible.

Other Wireline Topologies

The above description has focused on a ring topology. However, it is to be understood that a ring topology is not required. More generally, any appropriate topology interconnecting communication nodes may be implemented. A "communication node" generally refers to any node adapted to communicate with other nodes. A communication node may be a customer communication node, which is a node having an HCC and being associated with a user or household, or a central office communication node, which is a node associated with a central office. At least one of the nodes functions as a network switching device to interconnect the subscriber ring to the network. This node accepts traffic from the ring and forwards it on, and receives traffic for the ring and puts it onto the ring. In the example of FIG. 1, the network switching device is a central office while in the example of FIG. 3 described below, the network switching device is a gateway node in a pedestal; also known as a splice box or a distribution point. More generally still, the network switching device can be physically placed at any point, including mid-span, between the CO and the first customer. Of course, increasing the distance to the first customer will reduce the bandwidth capabilities on that link.

An example of another topology is a linear ADM or "Daisy Chain" topology. A linear ADM topology may be implemented whereby a set of communication nodes are connected together in series. A ring topology is a topology in which two end communication nodes are interconnected.

Other Ring Network

Figure 3:
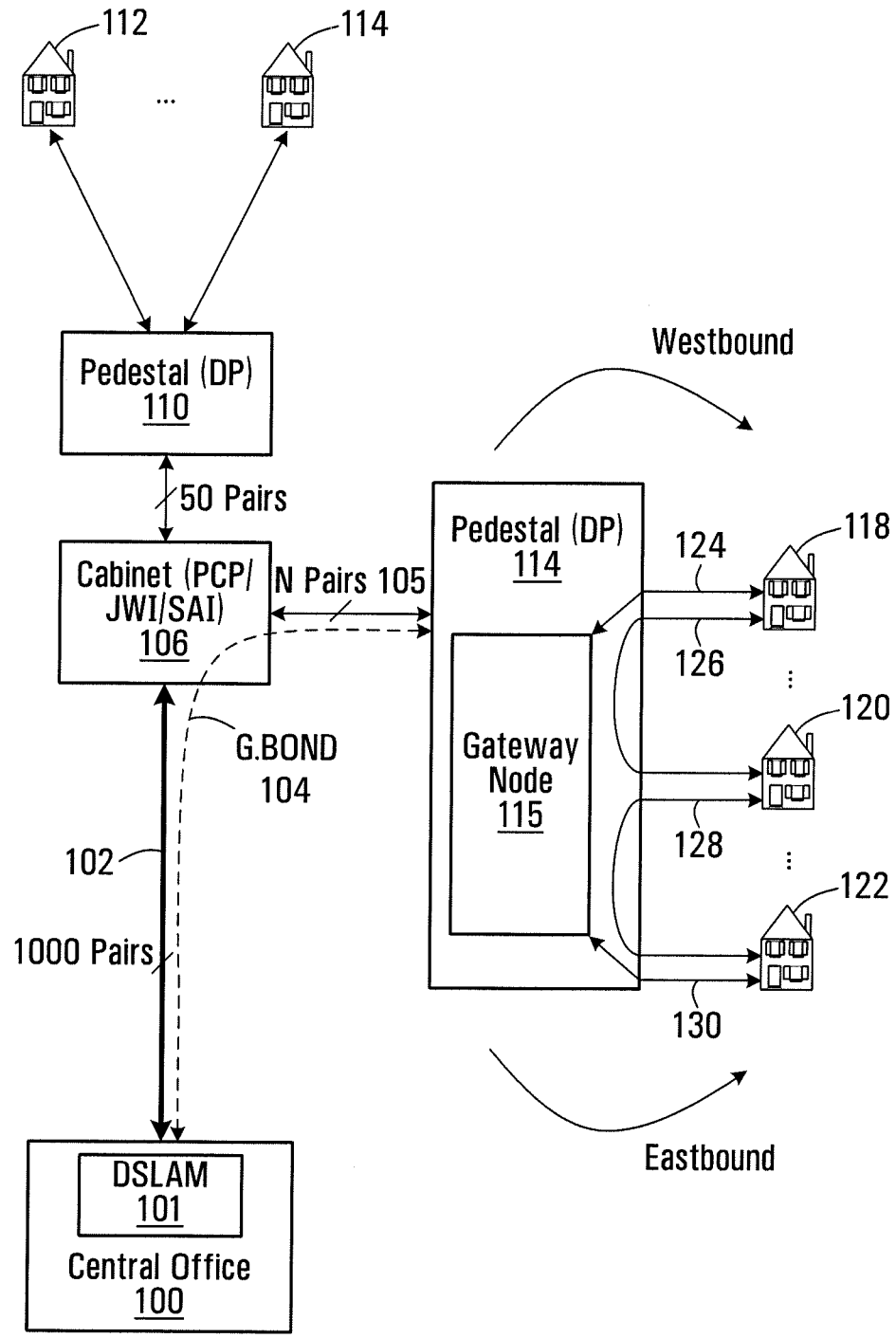
FIG. 3 is a block diagram of another network containing both a star implementation and a ring network topology.

Referring now to FIG. 3, another example of a DSL ring network is shown. A set of households 118, 120, 122 are connected in a ring configuration. The first household 118 is connected via 124 to a gateway node 115 forming part of pedestal 114. Similarly, household 122 is connected via 130 to the gateway node 115. The remaining households are connected in a ring similar to that of FIG. 1, but in this case the connections between consecutive houses on the ring go back through the pedestal 114. Thus, a connection 126 is shown between households 118 and 120, and a connection 128 is shown between households 120 and 122. More generally, an arbitrary number of households would be included on the ring. The pedestal 114 is shown connected via N Pairs 105 to a cabinet 106 (often called a Primary Connection Point—PCP—or Jumper Wiring Interface—JWI—or Service Access Interface—SAI—depending on the terminology of the network operator) which in turn is connected to a central office 100 having a DSLAM 101. The Pedestal 114 is connected to the Central Office 100 via the N Pairs 105 and N of the 1000 pairs 102 in a manner similar to that described in G.Bond (ITU 998.1/2/3) 104. For the purpose of comparison, also shown is a conventional pedestal 110 connected to households 112, 114 in a star topology.

A pedestal typically includes a number of incoming pairs from a network, a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

For the pedestal 114 that is participating in the DSL ring, only pairs 124 and 130 are connected to the gateway node 115. The remaining connections are between adjacent households. This can be achieved by making connections on a patch panel that forms part of the pedestal 114. For example, the interconnection 126 between households 118 and 120 can be achieved by connecting a jumper cable between a first pair going from the pedestal to the first household 118, and a second pair going to the second household 120. In this manner the configuration of the DSL ring is very flexible and can easily be changed by simply modifying the set of patches. In the illustrated example, the bandwidth from the central office 100 to the pedestal 114 is provided through the previously introduced bonding approach.

In particular, a set of pairs from the DSLAM 101 can be grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth; this may be passed around the ring with 64 Mb being transmitted in each direction by the gateway node 115. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

Figure 4:
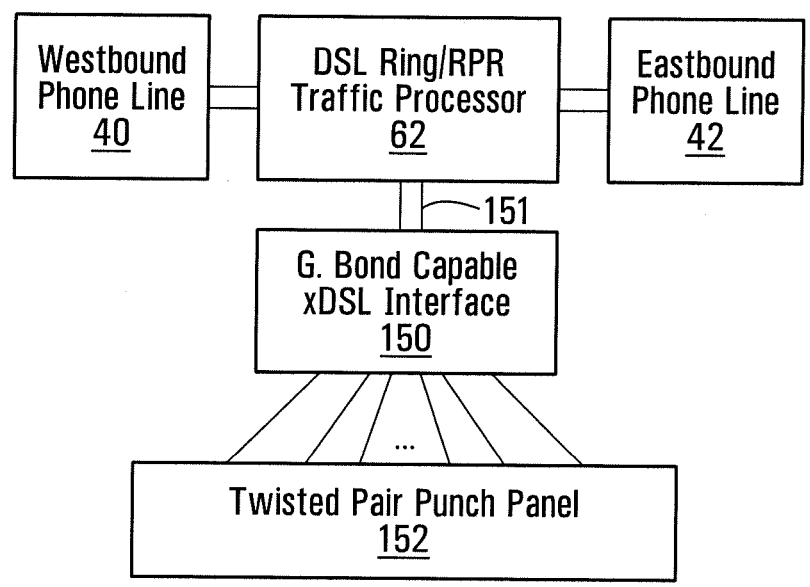
FIG. 4 is a block diagram of an example gateway node.

In some embodiments, the gateway node 115 behaves very much the same as the HCC on any of the households. FIG. 4 shows additional functionality that might be included in some gateway node implementations. This includes a G.Bond-capable xDSL interface 150 and a twisted pair punch panel 152. More generally, any set of components capable of exchanging traffic with the main network and the DSL ring can be used. This can be included in a gateway node that also includes a traffic processor that is basically the same as in the HCC described above. In this case, the G.Bond-capable interface 150 behaves in the same way as a communications device on the above described HCC, and is shown connected to an add/drop port 151 of the traffic processor 62; the only difference here is that substantially all of the traffic will be going to/from that device, with the possible exception of any traffic that might be terminated at the gateway node per se. A gateway node may include additional communications interfaces such as USB port(s), WiFi ports etc. as described for the HCC.

As can be seen from FIG. 3, the G.Bond protocol 104 is used to obtain maximum bandwidth from the CO 100 to the pedestal 114. The gateway node 115, which maybe environmentally hardened and powered via the twisted pairs from the CO, terminates the G.Bond 104 traffic and acts as a gateway for the DSL ring.

In some embodiments, at each node in the ring is a full ADM, based on VDSL2. The DSL transmission distance starts at zero again on each individual hop. In most cases these hops back to the pedestal and then to the neighbour's house are less than 300 meters (<1000 ft). VDSL2 bandwidth at this distance is in the >100 Mb/s range (depending on VDSL2 chipset manufacturer's specifications and the cable quality).

With rings there are two paths into and out of each house, each with the potential capability of carrying >100 Mb/s. Therefore the bandwidth potential for this scenario is potentially greater than 200 Mb/s (100 Mb/s Eastbound and 100 Mb/s Westbound) depending on the number of bonded pairs and the actual distance from the DSLAM to the pedestal. Basically the greater the number of subscribers on the ring, the greater the bandwidth pool available due to the greater number N of pairs available for bonding in the G.Bond 104 stream.

Rings also have the advantage of protecting themselves such that, if a single pair on the ring is cut, the traffic can be sent in the opposite direction to get to the gateway node. This is incredibly useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service.

In some embodiments, Local Loop Unbundling (LLU) is accomplished. In some embodiments this is achieved using the logical separation that is currently done via co-location in the CO (i.e., the traffic is carried by the incumbent from the customer to the CO and then handed off). In other embodiments, another gateway node is installed in the pedestal along with co-location in the CO. This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another embodiment, a wireless interface can be used through which the reach of the wireline network can be extended to reach other devices not connected directly by wireline connections. A second set of households are connected in a similar manner as described for the main network (the network described in previous embodiments), with wireline connections between pairs of households in a linear manner that might form a ring or linear ADM for example. At least one of the households has a wireless connection to one of the households on the main network.

In some embodiments, as described above, a wireless interface is available for performing protection switching in the event of failure of one or more wireline connections.

In some embodiments, a wireless connection can be used between the endpoints of two linear ADM topologies to complete a ring topology.

In some embodiments, the ring transmission protocol is based on the IEEE 802.17 Resilient Packet Ring (RPR) standard with some modifications to allow for different possible bandwidths between nodes and overall lower peek bandwidths. RPR was designed for metro optical networks. Ethernet-based rings, implementing Ethernet Automatic Protection Switching (EAPS) according to ITU-T Recommendation G.8031/Y.1342, for instance, are also contemplated.

In the embodiments described, packet add/drop functionality is included in each node to add/drop packets. More generally, traffic add/drop functionality is included. This might include packet add/drop functionality, or traffic implemented using timeslots or wavelengths/frequencies to name a few specific examples.

In some embodiments, the packet add/drop is in respect of DSL communication. This may for example be ADSL (Asynchronous DSL), ADSL2+, SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality.

As noted above, embodiments of the present invention may be applied to DSL rings. It should be appreciated, however, that FIGS. 1 to 4 and the foregoing description are intended solely as illustrative examples of the types of networks or topologies in conjunction with which embodiments of the invention may be implemented. Thus, the present invention is not necessarily limited to any particular types of network, topology, equipment, or protocols, for instance.

VDSL2

In the context of DSL technology, G.993.2 VDSL2 (Very high speed Digital Subscriber Line version 2) is an access technology that is designed to reliably provide a net data rate of up to 200 Mb/s (upstream plus downstream) using 30 MHz of the spectrum over existing twisted pair copper (typically 26 AWG, 0.4 mm) infrastructure that was originally deployed for POTS. VDSL2 has a wide variety of network deployment options including from the CO, from cabinets, and within buildings.

VDSL2 is an enhancement over earlier DSL versions including VDSL, ADSL2 and ADSL2Plus, and ADSL. However, VDSL2 uses DMT (Discrete Multi-Tone) modulation and hence is backwards compatible and will interoperate with these earlier versions. With VDSL2, the 30 MHz frequency spectrum is divided into up to 4096 non-overlapping frequency bands which are defined to carry either upstream or downstream bandwidth. Frequency bands are further divided into DMT subcarriers onto which bits are modulated for transmission. In accordance with an aspect of the present invention, VDSL2 bands can be modified to adjust the overall bandwidth and upstream versus downstream bandwidth ratios of a link.

The G.993.2 VDSL2 standard defines profiles (8a, 8b, 8c, 8d, 12a, 12b, 17a, 30a) to allow vendors to limit implementation complexity in setting the various parameters associated with VDSL2 (e.g., bandwidth and transmitter power) and target specific service requirements (e.g., long reach asymmetric). The 30a band profile provides the maximum symmetrical net data rate of 200 Mb/s.

The endpoint transceivers of a DSL link are defined as VTU-O (Central Office) and VTU-R (remote subscriber). VDSL2, like other DSL versions except ADSL, will continually negotiate between VTU-O and VTU-R transceivers based on changing conditions of the line within the context of the band profile to ensure the maximum bandwidth possible on the line and the best possible service.

VDSL2 bi-directional transmission streams over the frequency spectrum between VTU-O and VTU-R transceivers are logically broken up into one (and optionally two) latency paths, each containing one (and optionally two) bearer channels. The use of multiple latency paths and bearer channels may be used to provide differentiated services in VDSL2.

RPR

RPR is a packet-oriented Layer 2 protocol standard (IEEE 802.17) designed for the optimized transport of data traffic over ring networks, typically over SONET/SDH or Gigabit fiber. RPR was designed to increase the efficiency of Ethernet and IP based transport using the concept of counter-rotating rings called ringlets (ringlet0 and ringlet1) that connect nodes in the network.

Each node on the ring performs an add/drop multiplexer function, either adding or removing traffic to/from the ring or forwarding it on to its neighbouring nodes. Nodes on the ring are plug and play, and perform automatic topology discovery and advertise their capabilities, thereby allowing systems to become operational without manual intervention. Nodes may connect adjacent ring networks to form a hierarchical ring topology with access rings and backbone rings.

All traffic on the ring is assigned one of 3 differentiated classes of service: Class A for the transport of low latency and low jitter traffic such as voice, Class B for the transport of low latency traffic such as video, and Class C for the transport of best effort traffic such as Internet data.

Unicast, efficient multicast and simple broadcast are supported modes of transmission. Traffic may traverse the ring in either the ringlet0 direction or the ringlet1 direction concurrently in order to reach its destination. However, traffic does not necessarily consume bandwidth around the entire ring unlike with SONET/SDH's Unidirectional Path Switched Rings (UPSR). Spare ring bandwidth can be used to carry additional traffic, more akin to SONET/SDH's Bidirectional Line Switched Rings (BLSR) with extra traffic capability. This efficiency is termed Spatial Reuse, which allows for a more complete usage of ring bandwidth.

RPR also has mechanisms for ring protection with response times of 50 ms or less using wrapping and steering. With wrapping, traffic is looped back at the last node prior to the break and routed to its destination. Under steering, all nodes are notified of a topology change and they reroute their traffic accordingly. Generally, the optimum response is to wrap as soon as the fault is detected and notify the other nodes in the ring, which then steer their traffic accordingly around the fault.

RPR Over DSL

The RPR algorithm has elaborate mechanisms to ensure that all nodes are treated fairly with respect to ring bandwidth utilization and for congestion control. Excess bandwidth is quickly allocated to needing traffic classes in order to improve efficiency.

The RPR protocol is configured to run over the DSL ring network in one implementation of DSL Rings. Due to the nature of DSL link rates varying with the length and quality of the link, each individual DSL link on a ring can have varying total bandwidth. In addition, in accordance with some embodiments of the present invention, DSL links can exhibit asymmetry with respect to differing upstream versus downstream bandwidths.

RPR Fairness and Congestion Control

The RPR fairness algorithm prevents any one node from disproportionately occupying ring capacity and thereby causing congestion. Congestion is undesirable, since it can result in a failure to meet end-to-end traffic commitments and can allow nodes to use more than their fair share of the capacity for portions of the ring.

RPR specifies that a node is congested when the occupancy of the STQ (Secondary Transit Queue) is excessive in dual transmit queue systems, and for single transmit queue systems, when either the rate of transmission is excessive relative to the capacity of the transmission link or traffic is delayed excessively while awaiting transmission.

RPR handles congestion conditions by maintaining an instance of the RPR fairness algorithm for each ringlet (ringlet0 and ringlet1) per node, with each instance regulating the traffic associated with its ringlet. In order to meet ring fairness objectives, each fairness algorithm instance periodically computes a fairRate value and transmits this value, via a fairness frame hop by hop in the opposing (upstream) ringlet direction, making its value known to each of the nodes on the ring. The time between successive broadcasts of a node's fairRate value is known as the reportingInterval.

The fairRate value is adjusted based on relative link capacity and congestion at the node before being passed on to the upstream node according to exactly one of the following two methods: the aggressive method which provides responsive adjustments that favor utilization of ring capacity over rate stability, and the conservative method which provides highly damped adjustments that favor rate stability over utilization of ring capacity.

The conservative method differs from the aggressive method in that it provides for hysteresis in the transition between congested and non-congested states. This allows a node to remain in the congested state for a period of time after the condition has been removed, thereby preventing rate oscillation and ensuring that the effect of any previous adjustment has been observed. Note that both methods will converge to the fairRate value over time when the offered traffic at all nodes on the ringlet is constant.

An RPR node will adjust its allowed rate of transmitted traffic based on the received fairRate value, sending control indications to the attached RPR MAC clients in order to suspend traffic accordingly (via RPR sendA, sendB, sendC indications) thereby reducing traffic injected at the node and hence congestion downstream. Optionally, the allowed rate, fairRate and other attributes may be reported for further congestion control activities being performed at higher layers.

Both methods may be statically configured and can interoperate on a ringlet in some embodiments. For instance, each node could be configured to calculate the fairRate value individually, with neighbouring nodes using different methods. This provides flexibility to apply a different method at each node than its neighbouring nodes instead of being limited to selecting a single method for each ringlet or ring. Additional parameters associated with Quality of Service and/or queue fill levels might also be included in a fairness value, for example, to change the method itself. Other variations in the methods and applying different methods at different nodes may be or become apparent to those skilled in the art.

Overview

Turning now to aspects of the present invention in more detail, one embodiment thereof, Asymmetric DSL Rings (ADR), extends upon the concept of DSL Rings, allowing the ring to operate over individual DSL physical links that a) are VDSL2 or a compatible xDSL protocol, b) have varying net (upstream plus downstream) link bandwidth rates between nodes, c) have symmetric or asymmetric link bandwidth ratios, and d) optimize their bandwidth ratios to reflect bandwidth demand changes in the network.

Asymmetric DSL Rings may be fully compatible with DSL profiles specified in the VDSL2 standard. However, for VDSL2, the 30a profile might be desirable because it affords the network with the maximum 200 Mb/s net (upstream plus downstream) link bandwidth rate in addition to ratio adjustments to reflect changing bandwidth conditions.

In the present application, VTU-O is used to denote the DSL transceiver corresponding to the CO end of a DSL link, and VTU-R is used to denote a DSL transceiver corresponding to the remote end of the DSL link. This designation is for illustrative purposes only, and embodiments of the invention are not necessarily restricted to implementation in conjunction with any particular type of transceiver.

Figure 5:
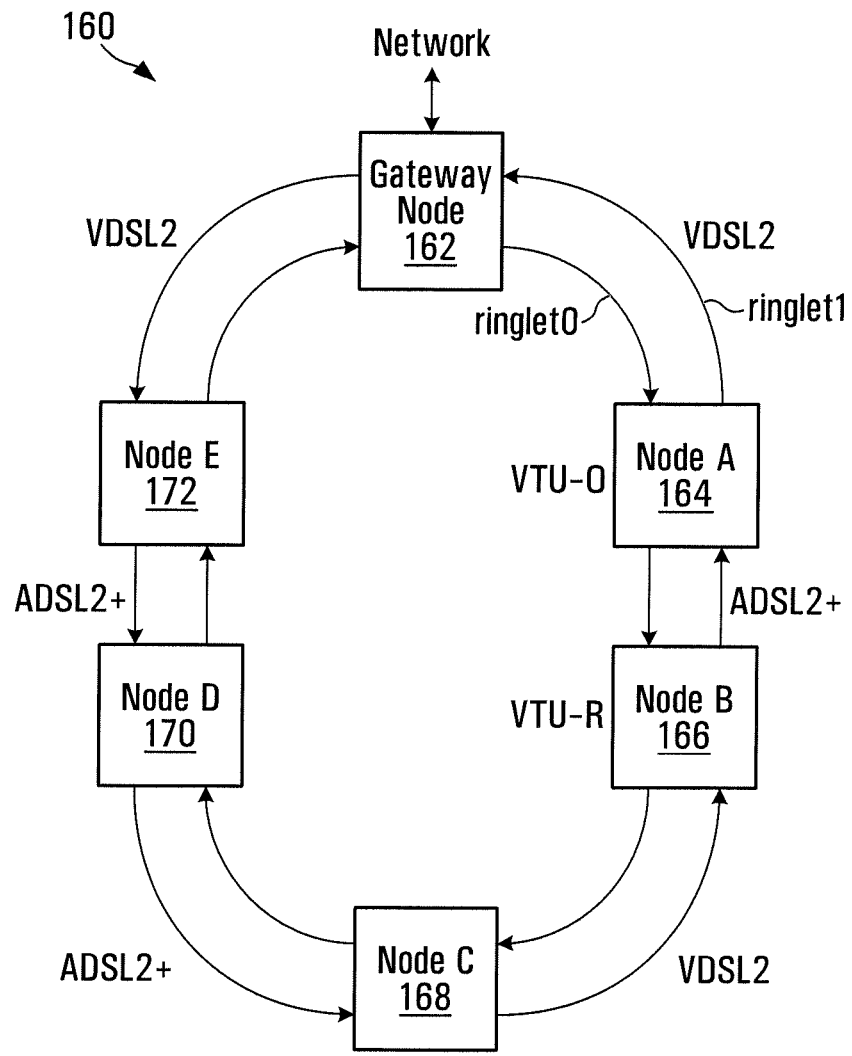
FIG. 5 is a block diagram of an example deployment of mixed xDSL links in a DSL ring.

FIG. 5 is a block diagram of an example deployment of mixed xDSL links in a DSL ring. The example ring network 160 includes a gateway node 162 which is both part of the ring and is also operatively coupled to a main communication network. Communication nodes A through E are shown at 164, 166, 168, 170, 172, and are interconnected in a ring topology with the gateway node 162. For ease of reference below, FIG. 5 illustrates directions of traffic transfer instead of connections between the various nodes. Communications between the nodes use different types of DSL technologies in the example shown.

Asymmetric DSL Rings can be provisioned in much the same manner as the DSL Rings described above, although the individual DSL links may conform to one or more of the above criteria and be engineered to service provider specifications. For example, in FIG. 5, a service provider may choose to run all downstream traffic on ringlet0 and upstream traffic on ringlet1 using a mix of VDSL2 and ADSL2Plus equipment in the ring network 160. Ringlet 0 is the clockwise direction of traffic flow from the VTU-O transceiver to the VTU-R transceiver, and ringlet1 is the opposite flow direction. Examples of a gateway node 162 and nodes A through E 164, 166, 168, 170, 172 in the form of customer or subscriber nodes have been described above.

Figure 6:
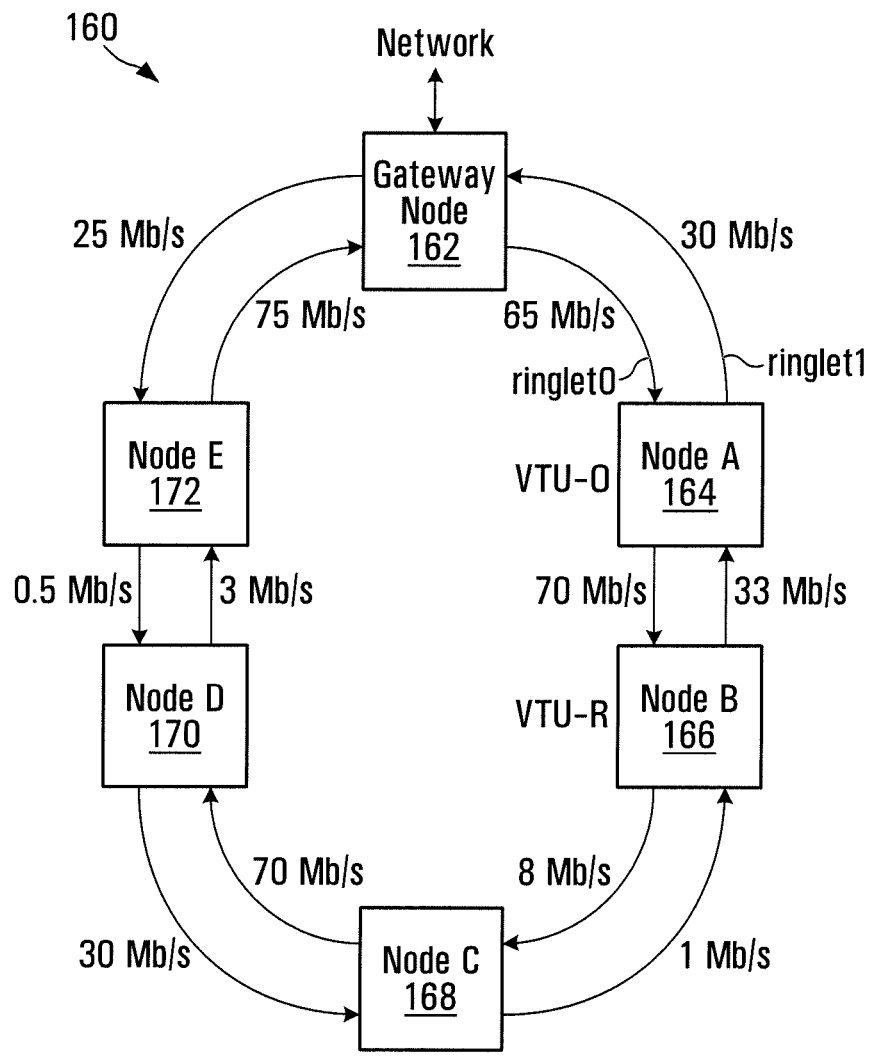
FIG. 6 is a block diagram of an example DSL ring with bandwidth bottlenecks.

The network ring 160 may have also been provisioned as in FIG. 6, which shows inherent bandwidth bottlenecks between nodes B and C 166, 168 and between nodes D and E 170, 172. These bandwidth bottlenecks cause traffic from the gateway node 162 to queue up and potentially be discarded at node B 166 and at node E 172. In this example, overall ring efficiency is diminished (or inoperable) leading to service delivery issues towards the end user.

With Asymmetric DSL Rings according to an aspect of the present invention, the overall bandwidth rate on the ring 160 need not be limited to the lowest common denominator link bandwidth rate (e.g., the link between nodes D and E 170, 172 in FIG. 6). An Asymmetric DSL Ring can operate effectively over ring links of varying bandwidths and bandwidth ratios, which were either provisioned or negotiated as part of the DSL handshake protocol under changing network conditions. This affords the service provider with additional degrees of freedom in provisioning bandwidth profiles on the ring 160. Bandwidth profiles can be changed not only between individual pairs of nodes but in each direction between those individual nodes. As noted below, control of the direction of transfer of traffic around a ring can provide a further degree of freedom.

An important aspect of Asymmetric DSL Rings that can be provided in some embodiments is that they may dynamically adjust link bandwidth ratios over time based on bandwidth demand in the network in order to maximize bandwidth efficiency on the ring.

Figure 7:
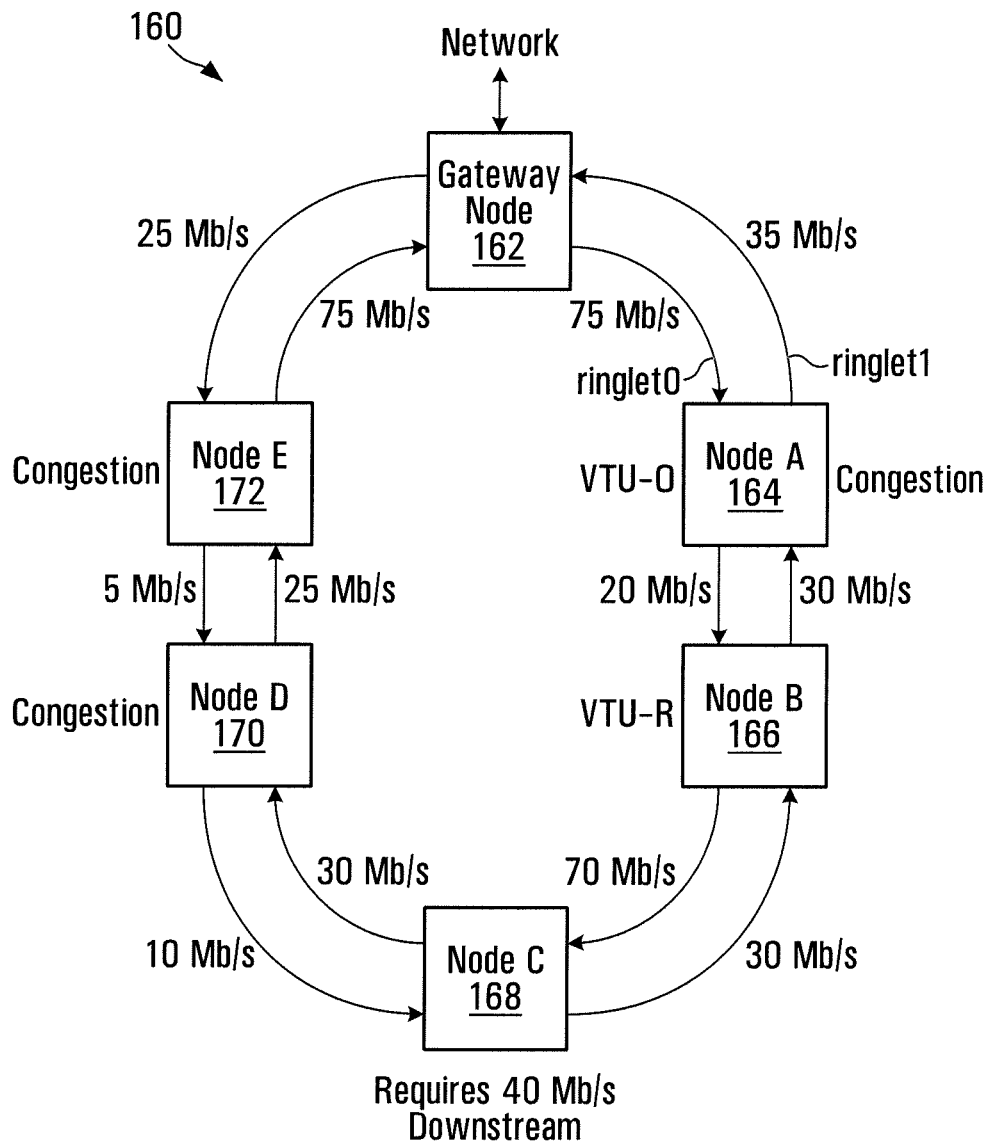
FIG. 7 is a block diagram illustrating an example migration of conditions of the DSL ring of FIG. 5.

For example, although a ring 160 may be provisioned to support the engineering model described in FIG. 5, over time and with various nodes being added and removed from the ring, the ring becomes as shown in FIG. 7. It may be determined that a particular node on the ring (node C 168 for instance) requires significantly more downstream bandwidth toward its neighbours. With a conventional DSL Ring topology, the bandwidth demands of node C 168 will cause the traffic patterns on the links preceding node C to change and may impact service delivery in the associated nodes.

As a remedy to the situation, the service provider may choose to physically connect node C in the pedestal nearest the gateway node 162 and may also look to adjust the asymmetric link bandwidth ratios to reduce latency of node C 168. Each of these actions has an associated and unwanted cost to the service provider.

Figure 8:
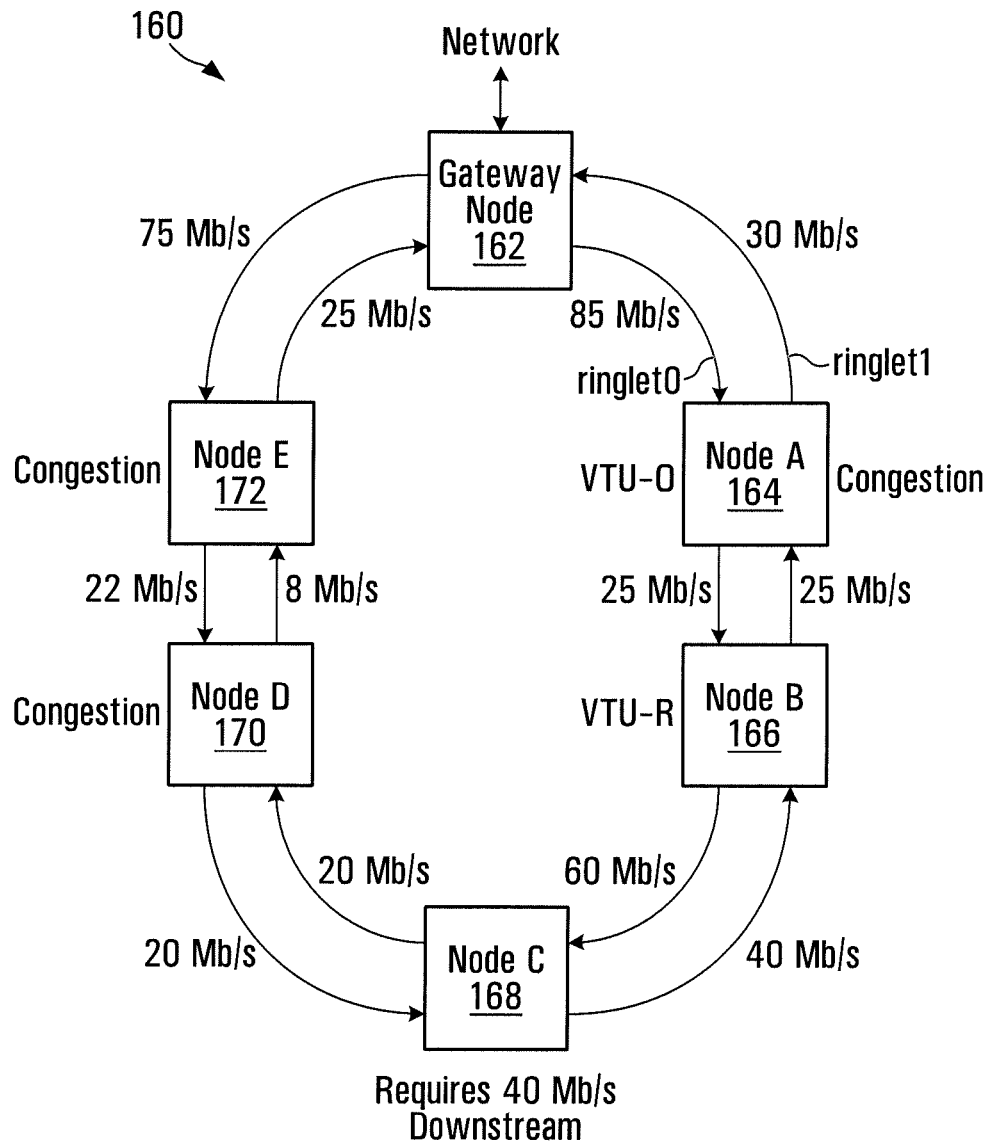
FIG. 8 is a block diagram illustrating example conditions of the DSL ring of FIG. 5 following optimization.

With Asymmetric DSL Rings, the bandwidth ratios are dynamically adjusted over time to the changing bandwidth demand on the ring 160. The service provider need not make any adjustments, as the ratios would be optimized automatically as described in FIG. 8, in which node C 168 now has the required 40 Mb/s downstream bandwidth to node B 166. As described in further detail below, embodiments of the invention may provide a tool for optimizing the bandwidth efficiency of ring networks, thereby increasing throughput and ensuring that each node on the ring obtains its fair share of the bandwidth with minimal latency.

With DSL-based rings, the bidirectional bandwidth sum between nodes can change dynamically due to many factors, including pressure on the physical wires, radio interference, physical degradation of the wires (e.g., corrosion), changes in the resistance or attenuation profile due to exceeded bend radius, or other factors. Without the techniques disclosed herein, for example, DSL rate adaption would diminish individual link speeds causing the entire ring to reduce its transmission capability to the lowest common denominator, even if the degradation was only between two nodes. Under certain conditions, the ring may even perform a protection switch away from that degradation, which could lead to an unnecessary segmentation of the ring, resulting in a drastic reduction in bandwidth transmission for all nodes.

Embodiments of the present invention may allow for the ring system to dynamically re-configure itself so that optimum bandwidth is obtained at any given moment in time based upon network demand. Using the example described in FIG. 7, with node C 168 having significant downstream bandwidth demands (e.g., where a subscriber is watching several HDTV channels simultaneously), the nodes between node C and the gateway node 162 (i.e., nodes A and B 164, 166) could alter their link bandwidth ratios to allow more bandwidth to come from the gateway node than go to the gateway node, thereby alleviating congestion conditions and reducing latency for all nodes on the ring.

Ring efficiency may be optimized using various network and link criteria applied to a link bandwidth management algorithm associated with the ring. Total link bandwidth might not necessarily be altered by the algorithm (although this may be done via an underlying xDSL protocol handshake, for example), but dynamically repartitioned to support network demands. Individual links on the ring can then be optimized without service interruption, thus ensuring overall ring efficiency.

RPR has been specified to run in a fixed bandwidth ring. With RPR over DSL, the RPR fairness and congestion control mechanisms are sufficient for static bandwidth DSL ring links, however more capability might be desirable when running over DSL links that are not all the same rate, have differing upstream versus downstream rates, and/or have rates that change dynamically because of link conditions. Existing RPR fairness algorithms can be made more efficient by dynamically altering the underlying DSL link bandwidth on a link-by-link basis to reflect changing network demand for bandwidth, for example.

Some embodiments of the invention capitalize on the RPR fairness and congestion control mechanism in an attempt to further optimize underlying DSL link bandwidth availability. Adjustments are made to the DSL link upstream versus downstream ratios at the DSL layer in an effort to "normalize" link speeds to actual usage patterns over time, thus making the overall DSL Ring more bandwidth efficient.

Algorithm

An illustrative example ADR algorithm is specified below for a DSL ring system that is configured in accordance with service provider specifications using a mixture of VDSL2 and compatible DSL links, and varying link bandwidths and bandwidth ratios. DSL links will migrate to optimum bandwidth ratios over time to suit the ring network conditions.

In one embodiment, each VTU-O transceiver in the system is configurable with Upsteam Rate Adaption Mode and Downstream Rate Adaption Mode, which would be set to DYNAMIC to allow the existing DSL rate adaption protocol to continually make adjustments and respond to link configuration parameters made by this algorithm. The ADSL protocol does not support the Upsteam Rate Adaption Mode and Downstream Rate Adaption Mode parameters, but they are supported by VDSL2, VDSL, ADSL2 and ADSL2Plus. Even though ADSL specific links in a ring system will not be able to benefit from using this particular algorithm, the remainder of the ring will.

It is possible that other algorithms will provide support for dynamic and/or asymmetric adaption in ADSL or other protocols. Thus, the present invention is in no way limited to the particular example algorithm proposed below.

The ADR algorithm may be configured as either an extension of the existing RPR fairness algorithm in a DSL Ring system or may be a separate entity altogether. The ADR algorithm may leverage rate statistics computed by the RPR fairness algorithm or may compute its own rate statistics based on bandwidth data obtained from the DSL link management entity at the VTU-O or the RPR management entity.

The discussion here focuses on an enhancement to the RPR fairness algorithm in a DSL ring implementation that would initiate the DSL bandwidth ratio adjustment over the DSL management interface when appropriate. Examples of two algorithms are presented in pseudo code below.

The ADR algorithm may be configured to run directly following each RPR fairRate calculation for each reportingInterval, or some other interval using the ADR_Interval timer when the ADR is a separate entity. The ADR algorithm may run in each node and operate on the VTU-O end of the ringlet in a DSL ring implementation.

RPR collects various local rate statistics per node, including the nrXmitRate value that counts all traffic except subclassA0 that is transmitted (added or transited) by the local node. The subclassA0 traffic corresponds to the reservedRate value and is the highest priority and only reserved traffic class. These statistics are "aged" in order to maintain a single smoothed counter (as opposed to having to keep N intervals of data and to avoid counter overflow) according to the translation formula:

Rate bytes/second=rate statistic/
(ageCoef*agingIntervals), where agingInterval is the period between aging operations and ageCoef specifies the relative weights assigned to (a) the change in value of the rate counter during the most recent agingInterval and (b) the value of the aged rate counter at the expiration of the previous agingInterval. The agingInterval and ageCoef values reflect physical DSL link speeds and may vary during the function of the DSL ring system as network conditions change.

At each agingInterval, rate statistics are smoothed with respect to past rate measurements by computing a weighted average of the current rate value and the previous smoothed value. The weight coefficient associated with the weighted average, lpCoef, is a configurable parameter in RPR. The lpnrXmitRate value is the smoothed representation of the nrXmitRate.

One embodiment of this invention leverages the RPR lpnrXmitRate and reservedRate values per ringlet in order to compute "normalized" DSL link upstream versus downstream bandwidth ratios. Over time, the particular ringlet has been shown to transmit lpnrXmitRate (aged) bytes and reserve reservedRate bytes for a given ringlet. We call the sum of the translated lpnrXmitRate value and the reservedRate the Average Bandwidth Demand (ABD) for the ringlet:

ABD=translated lpnrXmitRate+reservedRate.

Thus, one can compute the overall ABD for a given DSL link between two adjacent nodes as:

ABD Link=ABD on ringlet 0 (downstream)+ABD
on ringlet 1 (upstream).

Figure 9:
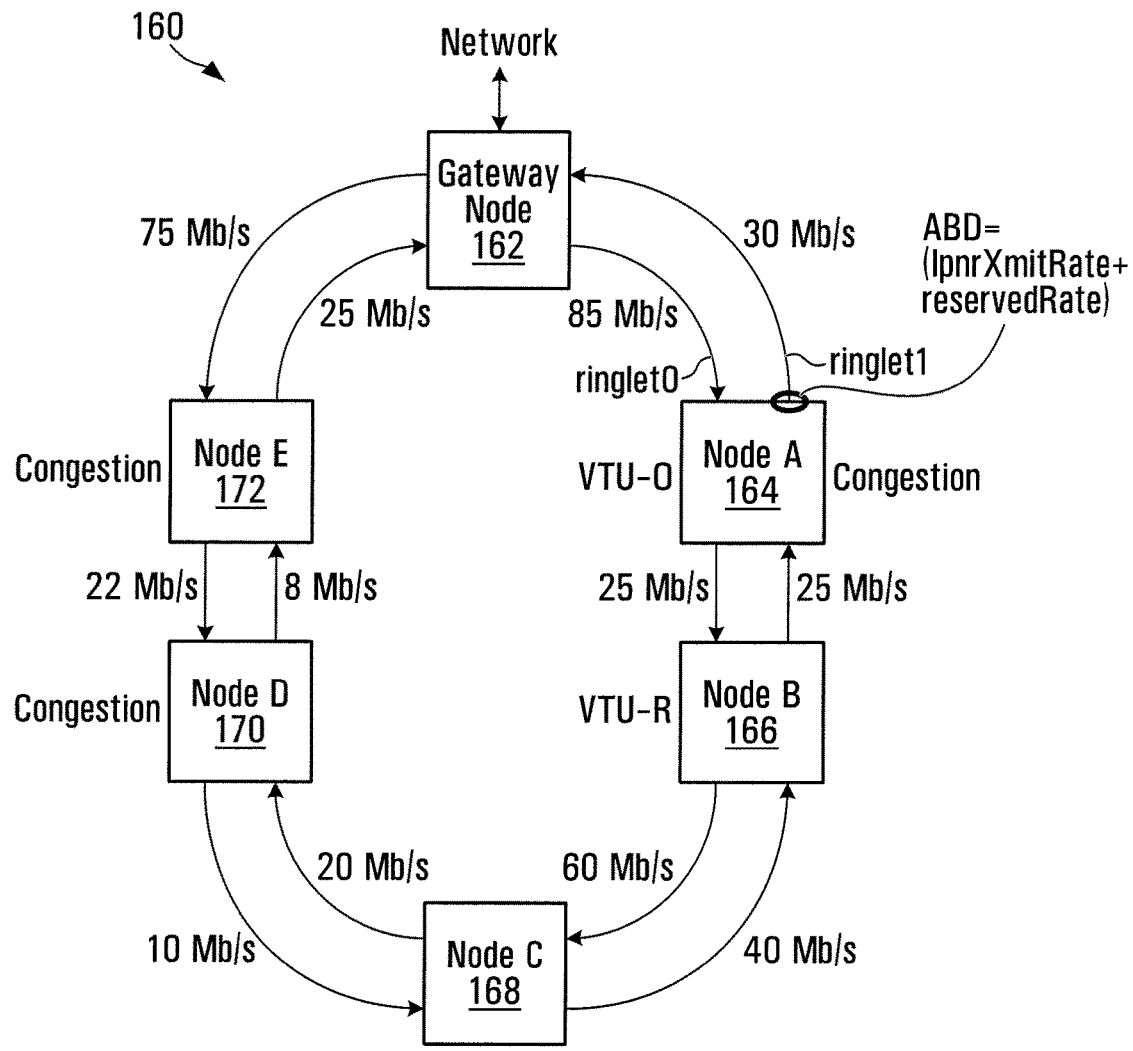
FIG. 9 is a block diagram illustrating Average Bandwidth Demand (ABD) for a DSL Link.

FIG. 9 is a block diagram illustrating Average Bandwidth Demand (ABD) for a DSL Link.

Further, the ratio of the downstream to upstream ABD for the same DSL link is given by:

ABDR Link=(ABD for ringlet0/ABD for Link)*100.

We call this ratio the Average Bandwidth Demand Ratio (ABDR) for the DSL link.

Figure 10:
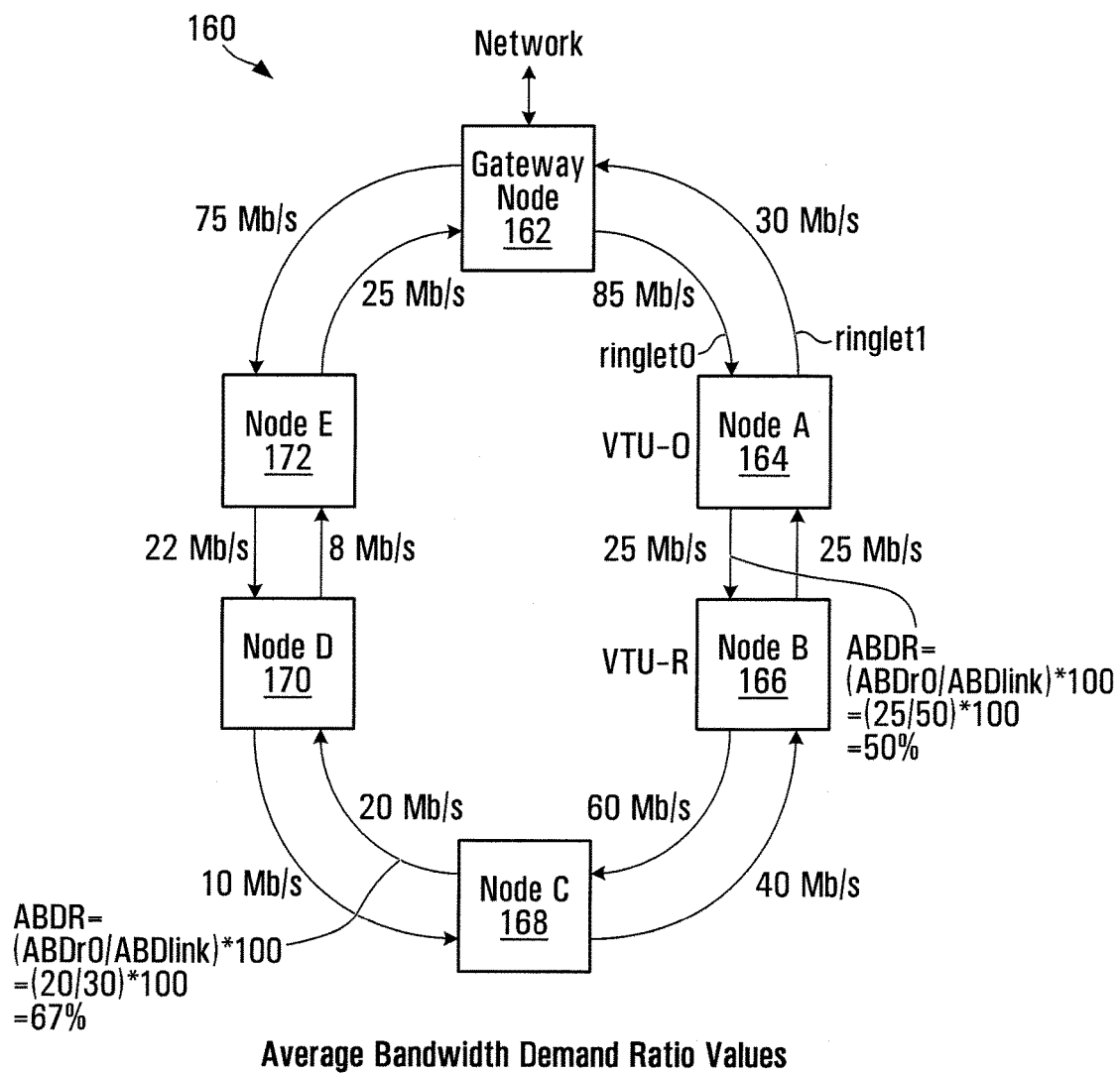
FIG. 10 is a block diagram illustrating Average Bandwidth Demand Ratio (ABDR) values.

A DSL link ABDR calculation uses the ABD value from the current node for ringlet0 and the corresponding value from ringlet1 in the adjacent downstream node when based on the RPR statistics. For example, in FIG. 10, the ABDR for the ringlet0 DSL link between adjacent nodes A and B 164, 166 is computed as 25/25=50%. The ABDR for the ringlet0 DSL link between nodes C and D 168, 170 is computed as 20/30=67%.

Figure 11:
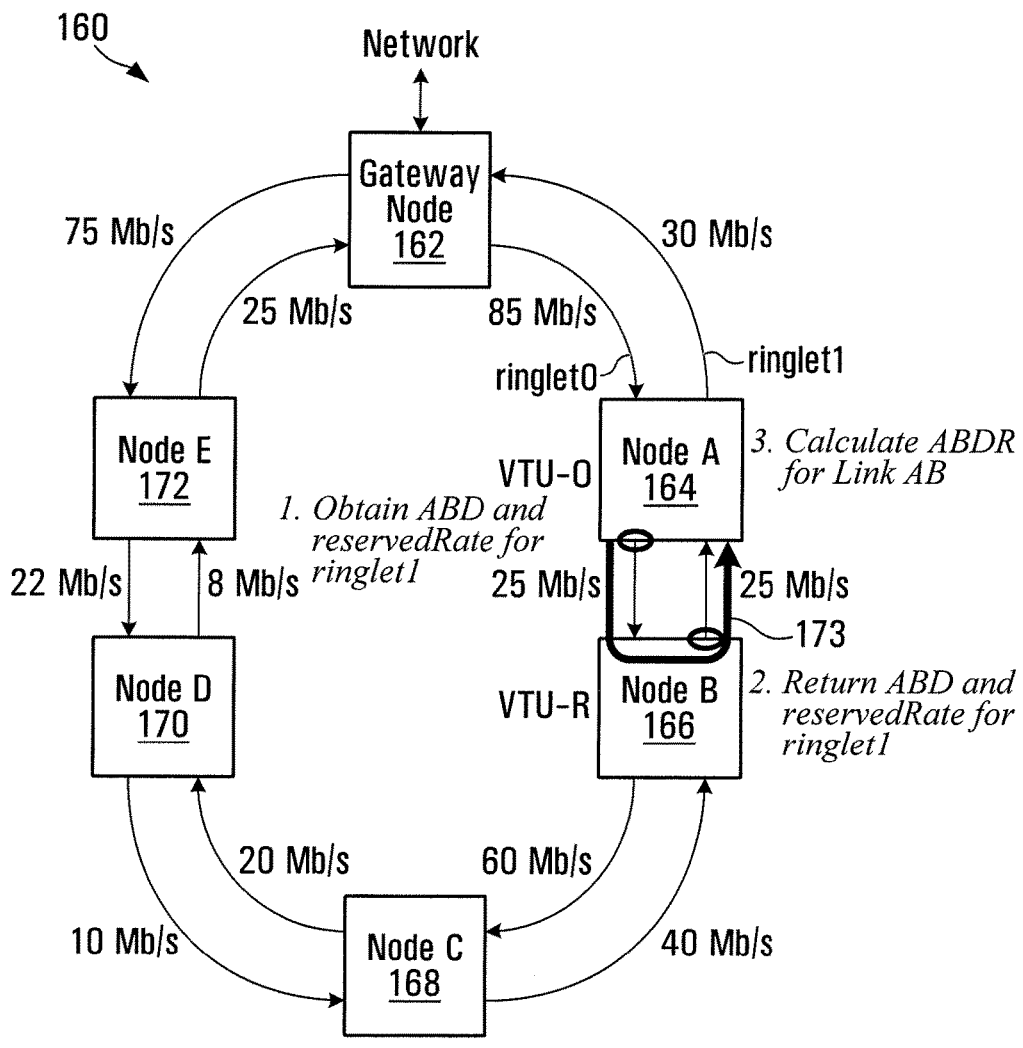
FIG. 11 is a block diagram showing an ABD determination handshake from an adjacent node.

An RPR organizational specific control frame can be sent to the adjacent node that contains the VTU-R transceiver via ringlet0 to obtain the ABD value for ringlet1. This control frame can be sent using the RPR MA_Control.request function with control code of OAM_ORG_REQ and sub-code of ABD_Value_Req. The adjacent node's ADR/RPR fairness algorithm intercepts the frame and creates an organizational specific control frame in response using the RPR MA_Control.request function with control code OAM_ORG_REQ and sub-code of ABD_Value_Ack including the ABD and reservedRate values for ringlet1. This control frame is sent back to the requesting node via ringlet1 for final ABDR calculation, as shown at 173 in FIG. 11, in one embodiment.

For a given node, only the DSL link attached to the VTU-O transceiver might be adjusted to reflect its ABDR. Doing so will also ensure rate changes are initiated by the appropriate DSL function and performed on one DSL link per node, but not both. The other DSL link attached to the VTU-R transceiver is adjusted by the algorithm in the adjacent node containing the corresponding VTU-O transceiver in one embodiment.

To determine if a change is in order, a comparison might be made between the newly calculated ABDR and the existing Rate Adaption Ratio configured for the DSL link. The ADR algorithm in the node might initiate a control request to query the Rate Adaption Ratio for each bearer channel in the underlying DSL link corresponding to the VTU-O transceiver via the link's Embedded Operations Channel (EOC). Messages are encoded on the EOC using the Simple Network Management Protocol (SNMP) in one embodiment. For efficiency, this query is performed periodically every ABDRQueryInterval (e.g., 50) runs of the ADR algorithm, with the prior ABDR value saved in local tables used as the Rate Adaption Ratio otherwise.

In some embodiments, ratios for all upstream versus downstream bearer channels are summed and compared to the newly calculated ABDR and if the two ratios differ by more than a configurable adjustThreshold percentage (eg. 5%) then a DSL link ratio change will be initiated by the ADR algorithm to correspond to the new ABDR. Using the threshold will serve to avoid excessive link adjustments while allowing the DSL ring network to migrate to optimal bandwidth configurations. The ADR algorithm in the node initiates a request to change the Rate Adaption Ratio for each bearer channel in the underlying DSL link corresponding to the VTU-O transceiver via the link's EOC and SNMP as with the query. The newly changed ABDR is then saved for a future run of the algorithm.

In a similar manner as with the Rate Adaption Ratio, the Minimum Reserved Data Rate for each upstream and downstream bearer channel can be optionally changed to correspond to the ringlet reservedRate values in RPR. The determination to change this value might be based on the reservedRateAdjust variable being set to true. ADSL does not support the Minimum Reserved Data Rate parameter but it is supported in VDSL2, VDSL, ADSL2 and ADSL2Plus, and hence the effect of this change could be system dependent.

One alternative approach to using the above standard configuration parameters is to make adjustments using the EOC control request and assigning individual DSL link frequency bands to either the upstream or downstream direction based on the ABDR, thus allocating more bandwidth to one direction and subsequently less to the other, while remaining within the total link capacity. This adjustment is initiated via the DSL Online Reconfiguration mechanism built into DSL using the Online Reconfiguration Command control in the EOC in some embodiments. To simplify configuration, existing configuration parameters can be queried from the DSL Link via the EOC channel using the Control Parameter Read control request. These values can then be updated with new parameters and resubmitted using the Online Reconfiguration Command control.

In some embodiments, changes to the above parameters will take effect in sub-second timeframes and be implemented using Seamless Rate Adaption techniques in the DSL layer to ensure that there is no adverse impact on traffic.

A method of adjusting the bandwidth ratios of individual DSL links in a DSL ring configuration according to the ABDR calculated on a link-by-link basis can thus be provided. Over time, each DSL link in the DSL ring can demonstrate bandwidth characteristics that closely mirror its corresponding ABDR.

Other parameters may also or instead be taken into account for the purposes of bandwidth adjustment, including but in no way limited to:
 minimum net data rate for each of the channels;
 maximum net data rate for each of the channels;
 reverting back to a default configuration after adjustments are made to alleviate congestion;
 aggressive versus conservative algorithm behaviour;
 a mechanism to force seamless rate adaption; and/or
 a response time of the algorithm, which might be taken into account when deciding whether or not to actually make an adjustment to alleviate congestion.

With respect to response time, the time it might take for an algorithm to react to network congestion may vary by implementation. For DSL, which is relatively slow, it may be possible to have sufficient processing power to have adjustments appear almost instantaneously. However, there may be other cases where either the processing power is relatively low or the bandwidth relatively fast, such that adjustments may appear to be slow. Thus, it may be useful to have a response time parameter capability designed into an algorithm.

Psuedo Code

The following example pseudo code describes an example link ADR algorithm for a given ring as a part of the RPR fairness algorithm. It assumes a steady state operation of the DSL ring.

```
repeat on each node in the ring {
    suspend until the reportingInterval timer expires
    calculate the ABD value for ringlet0 by converting lpn-rXmitRate to bytes per second and adding it to the reservedRate for ringlet0
    obtain the ABD value and reserved rate for ringlet1 by sending a message to the adjacent node and receiving a response with the ABD value and reservedRate for ringlet1
    calculate the ABDR for the link by dividing the ABD for ringlet0 by the ABD for the link and multiplying by 100, and save the value to memory
    if this is the ABDRQueryInterval adjustment interval then
        obtain the existing Rate Adaption Ratio value for the DSL link either by query through the management interface else obtain ABDR from memory
    if the calculated ABDR differs by more than adjustThreshold % with the existing ABDR (or Rate Adaption Ratio if queried) then configure the Rate Adaption Ratio of the DSL link with the new ABDR and if reservedRateAdjust is true then adjust the Reserved Rate of the DSL link
until (forever)
```

The following example pseudo code describes an example link ADR algorithm for a given ring in the absence of RPR statistics and as an independent entity from the RPR fairness algorithm.

```
repeat on each node in the ring {
    suspend until the ADR_Interval timer expires
    record bandwidth utilization for ringlet0 and save in sample history memory
    calculate ABD for ringlet0 using sample history memory and exponential moving average
    record bandwidth utilization for ringlet1 and save in sample history memory
    calculate ABD for ringlet1 using sample history memory and exponential moving average
    calculate the ABDR for the link by dividing the ABD for ringlet0 by the ABD for the link and multiplying by 100, and save the value to memory
    if this is the ABDRQueryInterval adjustment interval then
        obtain the existing Rate Adaption Ratio value for the DSL link either by query through the management interface else obtain ABDR from memory
    if the calculated ABDR differs by more than adjustThreshold % with the existing ABDR (or Rate Adaption Ratio if queried) then configure the Rate Adaption Ratio of the DSL link with the new ABDR and if reservedRateAdjust is true then adjust the Reserved Rate of the DSL link
until (forever)
```

Other implementations of features disclosed herein may be or become apparent to those skilled in the art.

Figure 12:
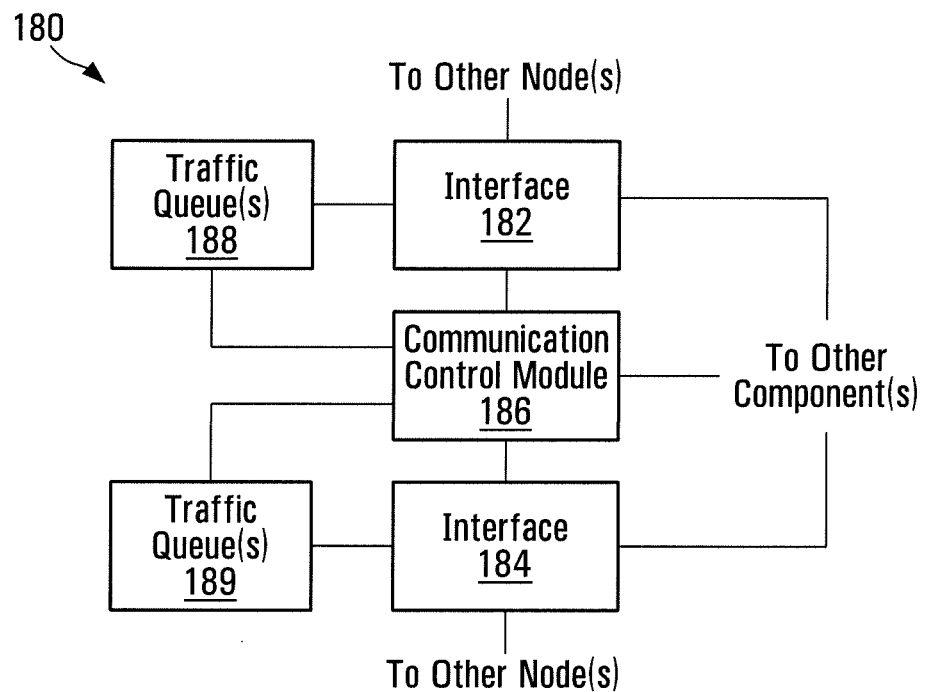
FIG. 12 is a block diagram of a communication node according to an embodiment of the invention.

FIG. 12 is a block diagram of a communication node 180 in accordance with an aspect of the invention. It should be noted that equipment in conjunction with which embodiments of the invention may be implemented may include further, fewer, or different components than those explicitly shown, such as components for actually processing or otherwise handling communication traffic. For example, the interfaces 182, 184 shown in FIG. 12 may be the HCC or gateway phone line interfaces 40, 42 of FIGS. 2 and 4, in which case the communication control module 186 might be implemented in software for execution by the DSL Ring/RPR traffic processor 62 or the main HCC processor 64. Thus, embodiments of the invention are in no way restricted to the specific implementation shown in FIG. 12.

Referring now to FIG. 12, interfaces 182, 184 are operatively coupled to traffic queues 188, 189, and all of these components are operatively coupled to the communication control module 186. Any or all of these components may also be operatively coupled to other components, as shown generally in the drawing.

The interfaces 182, 184 enable the communication node 180 to transfer communication traffic between first and second adjacent communication nodes at respective first and second communication rates. Depending on the implementation, a node in a ring or linear topology might have one interface or respective interfaces for communicating with the adjacent nodes.

The communication control module 186 may be implemented in hardware, software for execution by a processing element, firmware, or some combination thereof. Processing elements such as microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose.

Actual interconnections between components may also take any of various forms. Software components might interact with each other through shared memory locations or registers, for instance. More generally, components may be operatively coupled together directly or indirectly, through physical wired or wireless connections and/or "logical" rather than physical connections.

In operation, the communication control module 186 determines whether a congestion condition exists at the communication node 180 for transfer of communication traffic between first and second adjacent communication nodes, and requests adjustment of first and second communication rates by the first and second adjacent communication nodes to increase one and to decrease the other of the first and second communication rates where the congestion condition exists.

A determination as to congestion may be made by the communication control module 186 based on the amounts and/or delays of traffic stored in one or both of the traffic queues 188, 189. Queue fill levels may be determined by the communication control module 186 by accessing the queues directly or through other components, such as the interfaces 182, 184. Priority-based queues are also contemplated. An algorithm implemented in the communication control module 186 according to an embodiment of the invention may take into account traffic types when deciding whether or not to do a bandwidth adjustment. For example, if Class A traffic is building up between nodes A and B 164, 166 (see FIG. 5, for example), going towards the gateway node 162, but lower priority Class C traffic is building up in the opposite direction, the adjustment should still be done. In this case, the Class C traffic will wait longer.

In one possible implementation, once a buffer or queue that "faces" in a given direction exceeds a threshold, it sends a control packet back in the opposite direction to throttle, or reduce, the amount of traffic that the buffer/queue will have to deal with. In this manner, the issue of overflow and hence dropped traffic is minimized, in that the problem is passed back upstream, where there may be greater buffer depth to handle the issue, and may reach all the way back to the source. In the case of a clockwise buffer/queue threshold being exceeded, for example, a temporary throttling packet can be sent back upstream (counter-clockwise), while the downstream node is notified to increase the ratio of clockwise to counter-clockwise bandwidth.

In this manner, the ratio of clockwise to counter-clockwise bandwidth can be altered from the standard, static 1:1 to something else, including 1:1, in a dynamic fashion. In effect, a pass-through buffer-fill of the local node can affect both the upstream and downstream bandwidth configurations of the nodes around it.

It should be apparent from the foregoing that multiple traffic queues or buffers may be provided, as shown in FIG. 12 at 188, 189, and that certain communication control related functions could potentially be integrated into other components, such as where a buffer or queue generates a packet or other form of notification when a fill level threshold is exceeded.

As described above, the first and second communication rates between the communication node 180 and its adjacent nodes may be respective portions of total bandwidth available for bidirectional communication traffic transfer between the node and the adjacent nodes. In this case, the communication control module 186 may request rate adjustments by requesting adjustments to the portions of total available bandwidth for communication traffic transfer in a direction in which the congestion condition exists. Corresponding adjustments could also be made in the opposite direction, so as to maintain the same overall bidirectional bandwidth between nodes.

A rate adjustment need not necessarily remain in effect indefinitely. In one embodiment, the communication control module 186 is also able to detect an improvement in the congestion condition at the node 180, again possibly based on queue fill levels and/or traffic delays, and to request adjustment of the first and second communication rates by the first and second adjacent communication nodes toward respective default communication rates responsive to detection of an improvement. The adjacent nodes might revert to the default rates gradually over time according to an aging process, or in one adjustment step. Reverting to default rates may also or instead be an automatic process implemented at the adjacent nodes.

The rate adjustment process might include negotiation in some embodiments, with the communication control module 186 and the adjacent nodes negotiating respective adjusted first and second communication rates.

The foregoing description of FIG. 12 concentrates primarily on operations that a node 180 may perform when it wishes to initiate a rate adjustment. A communication control module 186 at each of the adjacent nodes may determine whether its communication rate with a requesting node should be adjusted due to the congestion condition, and if so, adjust the communication rate. This functionality may also be provided at a requesting node, to enable each node to dynamically adjust communication rates in order to adapt to conditions at its adjacent nodes.

The total link bandwidth between two nodes might include a plurality of frequency bands that are respectively allocated for transfer of communication traffic in opposite directions. In such a system, a communication control module 186 might adjust a communication rate by re-allocating a frequency band that has been allocated for communication traffic transfer in one direction to the opposite direction.

In the case of VDSL2-based rings, for example, there are frequency bands that are sent between nodes on individual wires. The standard Category 1 POTS twisted pair is treated as a single link with one frequency profile being transmitted/received on one physical wire and another profile on the other wire. The individual frequency bands used in each profile vary based on a number of conditions including national regulations. However, the bands can be set to be transmitted or received at each node. It is these frequency bands, in the case of DSL-based rings, that can have their settings changed on a dynamic basis in some embodiments. More generally, the techniques disclosed herein may be applied to any parallel- or multi-channel-type transmission technology including wireless or flexible WDM-based optical systems, for example.

Communication nodes in conventional networks do not normally increase their communication rates with an adjacent node responsive to a congestion condition at the adjacent node. However, according to an embodiment of the invention, this type of rate adjustment is supported by the communication control module 186. To this end, the communication control module 186 may determine whether the communication rate should be increased due to a congestion condition at the adjacent communication node, based on a request received from the adjacent node for instance, and increase the communication rate. The communication control module 186 may subsequently decrease the communication rate according to an aging process or responsive to a request received from the adjacent communication node, for example.

In some embodiments, a communication control module 186 also or instead enables respective communication rates between a communication node 180 and adjacent communication nodes to be set to different rates for opposite directions of traffic flow in a ring topology. Ratios of respective rates for each direction of traffic flow between the node and each adjacent node may be dynamically adjustable, such as in accordance with the algorithm described above. The communication control module 186 may collect information from the adjacent communication nodes, illustratively through a handshake process, and determine adjusted ratios based on the collected information, and possibly other parameters such as a threshold.

In some embodiments, a dynamic rate adjustment algorithm implemented by the communication control module 186 can be enabled or disabled on a node or inter-node connection basis. When dynamic rate adjustment is disabled, manually or otherwise provisioned or configured rates are not automatically adjusted.

These functions may be provided at any or all nodes in a linear or ring topology, including subscriber nodes such as HCCs and/or network nodes such as a gateway node.

According to other embodiments of the invention, a ring or string of nodes having links of differing maximum possible bandwidths can be configured asymmetrically in terms of total bandwidth. For example, each communication node might include a communication control module 186 that enables respective total communication rates between the plurality of communication nodes to be set to different rates between different communication nodes.

This feature might be implemented with nodes that support an ADM function in some embodiments. The communication links in such a network might enable the communication nodes to communicate via DSL, examples of which include at least ADSL, SDSL, Uni-DSL, VDSL, and VDSL2.

Another variation in a ring or string configuration might provide a communications mechanism that allows for the bandwidth to be dynamically allocated around at least part of the ring or all the way up the chain. Bandwidth could be changed in increasing amounts or percentages all the way back to a gateway node, for instance. Considering the example of nodes A, B, C connected serially in that order from a gateway node, as shown at 164, 166, 168, 162 in FIG. 5 for instance, if node C needs 30 Mb/s towards the gateway node, node B might attempt to adjust to a minimum of 30+B (its traffic bandwidth needs in that direction), and node A could similarly attempt to adjust to 30+B+A (its own traffic bandwidth needs in that direction), etc. Bandwidth in the other direction could be adjusted to maintain the previous total bandwidth between each pair of nodes.

In one implementation of this feature, a network comprises a plurality of communication nodes, a plurality of communication links operatively coupling the communication nodes together in a ring or linear topology, and respective communication control modules 186, in the communication nodes, that allow bandwidth to be dynamically allocated along a string of the communication nodes from a first communication node to a second communication node through one or more intermediate nodes between the first and second communication nodes. The communication control modules 186 in the intermediate communication nodes may change bandwidth in increasing amounts all the way to the second communication node, as noted above.

The techniques disclosed herein may be applied to multiple levels in a network, including the node-to-node link level, or a network-wide level. Thus, a higher level version of rate adaptation and/or other features might run on a convergence node (gateway node) to provide for ring-wide link adjustment on a somewhat slower timescale, for example. A method to handle conflicts between adjustment determinations at different levels may depend on where priority is placed (i.e., higher level or lower level, which may be an implementation detail or a configuration parameter-type process), for instance.

A higher level algorithm would be cognizant of the ring/string topology (which may also include the case of a ring with an active protection switch). While RPR allows for this type of discovery process, the algorithm might also automatically engage the "aggressive" bandwidth adjustment mode in the case of a link failure for a time, at least until the other nodes can steer their traffic appropriately.

The communication node 180 may implement such a higher level technique. An interface such as 182, 184 enables the communication node to communicate with other communication nodes in a ring or linear topology. The other communication nodes include at least one adjacent communication node with which the communication node 180 communicates directly and non-adjacent communication nodes with which the communication node communicates through intermediate communication nodes. The communication control module 186, which as noted above is operatively coupled to the interfaces 182,184, determines whether respective communication rates between the plurality of communication nodes should be adjusted based on information associated with the adjacent communication nodes and the non-adjacent communication nodes, and requests adjustment of any of the respective communication rates that should be adjusted.

If each of the other communication nodes also includes a local communication control module 186 that determines whether a local communication rate at the node should be adjusted, the local communication control module might apply a conflict resolution process where the local communication control module and the communication control module at the communication node make different determinations for adjustment of the local communication rate. The conflict resolution process could take into account relative priorities of the communication node and the other communication nodes, for example.

Yet another function that could also or instead be provided by a communication control module 186 relates to the possibility of re-routing (i.e., changing the direction of) lower level traffic in mid-stream. This could be done by calculating the delay on traffic in lower priority transit queues (i.e., queues that deal with traffic that only transits a node but is not added or dropped and is not a multicast or broadcast packet) based on bandwidths and reported queue-fill levels upstream. If the delay was calculated to be less in one direction than the other, then a packet could be hairpinned back towards its source. This is something that could be calculated and taken into account when the traffic is added to the ring, to send packets in the direction with the lowest delay. However, delay can be highly dynamic and often dependent on the relative amounts of higher priority traffic already on the ring. Dynamic rerouting of traffic as it transits a node may provide for more effective handling of traffic under changing delay conditions, since delay can be calculated, possibly multiple times, after traffic has been added to the ring.

A communication node 180 that supports this type of feature might include at least one interface 182, 184 that enables the communication node to communicate with other communication nodes in a ring topology, and a communication control module 186, operatively coupled to the at least one interface, that receives communication traffic for transmission on the ring, determines a direction of least delay for transfer on the ring, and transmits the received traffic through the at least one interface in the determined direction of least delay.

Figure 13:
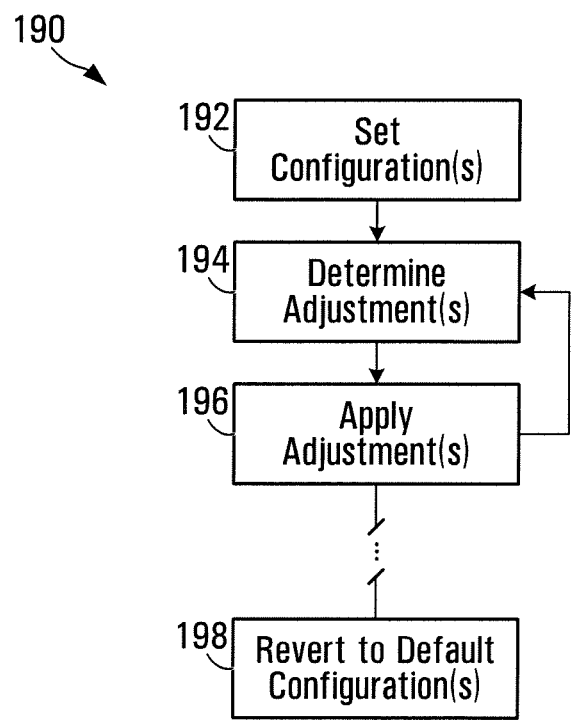
FIG. 13 is a flow diagram illustrating a method according to an embodiment of the invention.

A method according to an embodiment of the invention is shown in flow diagram form in FIG. 13. This example method 190 is intended solely for illustrative purposes, and other embodiments, in which further, fewer, or different operations are performed in a similar or different order, are contemplated. Variations of the method may be or become apparent to those skilled in the art from the foregoing description of apparatus features and functions for instance.

In the example shown, communication configurations, such as rate(s) and/or, in the case of a ring topology, normal directions of traffic flow, are set at 192, and adjustments to those settings may be determined at 194. For example, a determination may be made at a communication node as to whether a congestion condition exists for transfer of communication traffic by the communication node between a first adjacent communication node and a second adjacent communication node. Adjustment of the first and second communication rates by the first and second adjacent communication nodes to increase one of the first and second communication rates and to decrease the other of the first and second communication rates may be requested where the congestion condition exists. Directions of traffic flow may also or instead be dynamically controlled.

Adjustments, if any, can then be applied at 196, and the process may be repeated. Also shown in FIG. 13 is an operation 198 to revert to default configuration(s).

As will be apparent from the foregoing description of the communication node shown in FIG. 12, a node that receives communication traffic from an adjacent communication node at a communication rate might determine whether the communication rate should be increased due to a congestion condition at the adjacent communication node for transfer of communication traffic to the communication node. If so, the communication rate is increased.

The initial setting shown at 192 in FIG. 13 may, in some embodiments, involve setting respective communication rates between the communication node and the adjacent communication nodes to different rates for opposite directions of traffic flow in a ring topology. A dynamic ratio adjustment algorithm may be provided to adapt the initial rates to changing conditions.

Variations of the method shown in FIG. 13 may include a method comprising providing for exchange of communication traffic between a plurality of communication nodes in a ring or linear topology, and setting respective total communication rates between the plurality of communication nodes to different rates between different communication nodes. The respective rates can thereafter be adjusted in some embodiments.

Another possible method involves providing for exchange of communication traffic between a plurality of communication nodes in a ring or linear topology, and dynamically allocating bandwidth along a string of the communication nodes from a first communication node to a second communication node through one or more intermediate nodes between the first and second communication nodes.

Yet another variation includes providing for communications between a communication network node and other communication nodes in a ring or linear topology, the other communication nodes comprising at least one adjacent communication node with which the communication node communicates directly and non-adjacent communication nodes with which the communication node communicates through intermediate communication nodes, determining at the communication node whether respective communication rates between the plurality of communication nodes should be adjusted based on information associated with the adjacent communication nodes and the non-adjacent communication nodes, and requesting adjustment of any of the respective communication rates that should be adjusted.

In some embodiments, the configuration could be a direction of transfer of communication traffic. In this context a method might include receiving communication traffic for transmission on a ring, determining a direction of least delay for transfer on the ring, and transmitting the received traffic on the ring in the determined direction of least delay.

What has been described is merely illustrative of the application of principles of embodiments of the invention. Other arrangements and methods can be implemented by those skilled in the art without departing from the scope of the present invention.

For example, the concepts presented herein may also be applied to other systems than DSL rings, such as ADM-based and regenerator-based string configurations, independent of the underlying transmission technology (wired, wireless, optical, etc.) used to implement those network configurations. The network might sense and adjust link upstream versus downstream bandwidth ratios dynamically in response to changing network conditions in order to improve network efficiency.

In addition, although described primarily in the context of methods and systems, other implementations of the invention are also contemplated, as instructions and/or data structures stored on a computer-readable medium for example.

The present application refers to technology related to G.997.1, Physical Layer Management for DSL Transceivers, in conjunction with which some embodiments may be implemented.

I claim:

1. A communication node comprising:
   at least one interface that enables the communication node to communicate with other communication nodes via communication links established over underlying DSL (Digital Subscriber Line) links in a ring or linear topology, the other communication nodes comprising at least one adjacent communication node with which the communication node communicates directly and non-adjacent communication nodes with which the communication node communicates through intermediate communication nodes; and a communication control module, operatively coupled to the at least one interface, that determines whether respective communication rates on the communication links should be adjusted based on information associated with the adjacent communication nodes and the non-adjacent communication nodes, and requests adjustment of one or more of the underlying DSL links to adjust any of the respective communication rates that should be adjusted, wherein each of the respective communication rates comprises first and second portions of total bandwidth available for bidirectional communication traffic transfer via a communication link over an underlying DSL link, the first portion comprising bandwidth allocated to communication traffic transfer in a first direction and the second portion comprising bandwidth allocated to communication traffic transfer in a second direction opposite the first direction, wherein the total bandwidth comprises a plurality of frequency bands respectively allocated for communication traffic transfer in the first and second directions, and the communication control module requests adjustment by requesting re-allocation of one or more of the plurality of frequency bands from one of the first and second portions to the other of the first and second portions.

2. The communication node of claim 1, implemented in a communication system that comprises the communication node and the other communication nodes, wherein each of the other communication nodes comprises a local communication control module that determines whether a local communication rate at the node should be adjusted.

3. The communication node of claim 2, wherein each local communication control module resolves a conflict, where the local communication control module and the communication control module at the communication node make different determinations for adjustment of the local communication rate, taking into account relative priorities of the communication node and the other communication node comprising the local communication control module.

4. The communication node of claim 1, wherein the DSL links are of a type selected from a group consisting of: ADSL (Asynchronous DSL), ADSL2+, SDSL (Symmetric DSL), Uni-DSL (Universal DSL), VDSL (Very high bit rate DSL), VDSL2 (Very high bit rate DSL version 2), and another iteration of DSL.

5. The communication node of claim 1, wherein the respective communication rates comprise different communication rates on respective communication links.

6. The communication node of claim 5, wherein the communication control module requests adjustment by requesting adjustment via an underlying DSL protocol handshake.

7. The communication node of claim 1, wherein the communication control module determines whether the respective communication rates should be adjusted based on rate statistics collected at the communication node and the other communication nodes.

8. The communication node of claim 7, wherein the rate statistics comprise rate statistics collected according to RPR (Resilient Packet Ring) protocol.

9. The communication node of claim 7, wherein the communication links support bidirectional communications, and wherein the communication control module determines an ABD (Average Bandwidth Demand) and an ABDR (Average Bandwidth Demand Ratio) for each direction at each communication node and determines whether the respective communication rates on the communication links should be adjusted based on the ABD and the ABDR for each direction at each communication node.

10. A method comprising:

providing for communications between a communication node and other communication nodes via communication links established over underlying DSL (Digital Subscriber Line) links in a ring or linear topology, the other communication nodes comprising at least one adjacent communication node with which the communication node communicates directly and non-adjacent communication nodes with which the communication node communicates through intermediate communication nodes;

determining at the communication node whether respective communication rates on the communication links should be adjusted based on information associated with the adjacent communication nodes and the non-adjacent communication nodes; and requesting adjustment of one or more of the underlying DSL links to adjust any of the respective communication rates that should be adjusted, wherein each of the respective communication rates comprises first and second portions of total bandwidth available for bidirectional communication traffic transfer via a communication link over an underlying DSL link, the first portion comprising bandwidth allocated to communication traffic transfer in a first direction and the second portion comprising bandwidth allocated to communication traffic transfer in a second direction opposite the first direction, wherein the total bandwidth comprises a plurality of frequency bands respectively allocated for communication traffic transfer in the first and second directions, and the requesting comprises requesting re-allocation of one or more of the plurality of frequency bands from one of the first and second portions to the other of the first and second portions.

11. The method of claim 10, further comprising:
determining at each of the other communication nodes whether a local communication rate at the other communication node should be adjusted.

12. The method of claim 11, further comprising:
resolving a conflict at each of the other communication nodes that makes a different determination for adjustment of the local communication rate than the determination made at the communication node, the resolving taking into account relative priorities of the communication node and the other communication node.

13. The method of claim 10, wherein the DSL links are of a type selected from a group consisting of: ADSL (Asynchronous DSL), ADSL2+, SDSL (Symmetric DSL), Uni-DSL (Universal DSL), VDSL (Very high bit rate DSL), VDSL2 (Very high bit rate DSL version 2), and another iteration of DSL.

14. The method of claim 10, wherein the respective communication rates comprise different communication rates on respective communication links.

15. The method of claim 14, wherein the requesting comprises requesting adjustment via an underlying DSL protocol handshake.

16. The method of claim 10, wherein determining at the communication node comprises determining whether the respective communication rates should be adjusted based on rate statistics collected at the communication node and the other communication nodes.

17. The method of claim 16, wherein the rate statistics comprise rate statistics collected according to RPR (Resilient Packet Ring) protocol.

18. The method of claim 16, wherein the communication links support bidirectional communications, and wherein the determining at the communication node comprises determining an ABD (Average Bandwidth Demand) and an ABDR (Average Bandwidth Demand Ratio) for each direction at each communication node and determining whether the respective communication rates on the communication links should be adjusted based on the ABD and the ABDR for each direction at each communication node.

* * * * *